US005718187A

United States Patent [19]

Pollock et al.

[11] Patent Number: 5,718,187
[45] Date of Patent: Feb. 17, 1998

[54] POULTRY FEEDER

[75] Inventors: Eugene B. Pollock, Assumption; Jeffrey L. Knollenberg, Taylorville, both of Ill.

[73] Assignee: The GSI Group, Inc., Assumption, Ill.

[21] Appl. No.: 540,579

[22] Filed: Oct. 6, 1995

Related U.S. Application Data

[63] Continuation of Ser. No. 126,238, Sep. 24, 1993, Pat. No. 5,462,017, which is a continuation-in-part of Ser. No. 991,383, Dec. 15, 1992, Pat. No. 5,311,839.

[51] Int. Cl.$^6$ ............................................. A01K 39/01
[52] U.S. Cl. ............................................. 119/52.4; 119/57.4
[58] Field of Search ............................ 119/52.4, 53, 57.4, 119/61, 72, 81

[56] References Cited

U.S. PATENT DOCUMENTS

| | | |
|---|---|---|
| 984,980 | 2/1911 | Taylor. |
| 1,154,073 | 9/1915 | Stocking. |
| 1,855,781 | 4/1932 | Tolley ............................ 119/61 |
| 1,862,349 | 6/1932 | Perry ............................. 119/61 |
| 1,864,569 | 6/1932 | Willauer ......................... 119/61 |
| 3,033,163 | 5/1962 | Hostetler et al.. |
| 3,105,463 | 10/1963 | Pilch ............................ 119/51.4 |
| 3,230,933 | 1/1966 | Myers et al. .................... 119/53 |
| 3,388,690 | 6/1968 | Hostetler ....................... 119/53 |
| 3,415,228 | 12/1968 | Myers .......................... 119/51.11 |

(List continued on next page.)

FOREIGN PATENT DOCUMENTS 449823  1/1926  Germany ............................ 119/61

OTHER PUBLICATIONS

Big Dutchman Broiler Feeder Brochure.
Chore–Time Catalog "Breeder Pullet Feeding System".
Chore–Time Catalog "Now . . . There Is A New Way To Feed Turkey Poults".
"The Chore–Time Advantage For Breeders" Model C2 Feeder p. 4.
Chore–Time Brochure Model C Breeder Feeder.
"Chore–Time Program Feeder" Model H Feeder.
Chore–Time Facts Sheet—Model H and CT.
Cumberland Catalog—"Grilless Frying Pan Feeding System".
Sipco Brochure.
Cablevey Brochure.
PEC Brochure.
Lohmann Angagenbau Brochure.
Hart Mfg. Co., Glendale, California Pan Feeding Systems.
SKA Brochure.

*Primary Examiner*—Robert P. Swiatek
*Attorney, Agent, or Firm*—Polster, Lieder, Woodruff & Lucchesi

[57] ABSTRACT

A poultry feeder (10) comprising a generally vertically disposed feed tube (18) adapted to be installed on a generally horizontal feed conveyor tube (14) for receiving feed from the feed conveyor tube. The feed tube has an upper portion (26) fixed with respect to the feed conveyor tube and a lower portion (27) movable axially with respect to the upper portion between an extended position (as shown in FIG. 5) and a collapsed position (FIG. 6). A feed pan (23) is disposed below the bottom end of the feed tube for receiving feed. A lost motion connection (32) is provided between the feed pan and feed tube, with the lost motion connection including a generally vertically disposed rim (46) surrounding the outer portion of the feed pan and permitting relative movement between the feed pan and the feed tube between the pan and the feed tube between an extended position in which the feed tube is in its extended position and in which the rim extends up above the level of the feed pan thereby to aid in containing feed within said feed pan and a lowered position in which the feed pan rests on the floor and in which the rim is lower with respect to the feed pan thereby to lower the height of the feed pan so as to permit young chicks or the like to readily view feed deposited within the feed pan and to have access to the feed therein.

7 Claims, 11 Drawing Sheets

U.S. PATENT DOCUMENTS

| | | | |
|---|---|---|---|
| 3,511,215 | 5/1970 | Myers | 119/53 |
| 3,598,087 | 8/1971 | Ramser et al. | 119/51.11 |
| 3,742,913 | 7/1973 | Crippen | 119/51.11 |
| 3,811,412 | 5/1974 | Murto et al. | 119/53 |
| 3,971,340 | 7/1976 | Allen | 119/53 X |
| 4,070,990 | 1/1978 | Swartzendruber | 119/53 |
| 4,348,988 | 9/1982 | Lawson | 119/53 |
| 4,476,811 | 10/1984 | Swartzendruber | 119/53 X |
| 4,527,513 | 7/1985 | Hart et al. | 119/51.5 |
| 4,552,095 | 11/1985 | Segalla | 119/53 |
| 4,800,844 | 1/1989 | Van Gilst | 119/51.5 |
| 4,834,026 | 5/1989 | Brembeck et al. | 119/53 |
| 5,007,380 | 4/1991 | Badia et al. | 119/53 |
| 5,092,274 | 3/1992 | Cole et al. | 119/53 X |
| 5,113,797 | 5/1992 | Van Daele | 119/53 |
| 5,184,570 | 2/1993 | Hostetler | 119/72 |
| 5,275,131 | 1/1994 | Brake et al. | 119/52.4 X |
| 5,497,730 | 3/1996 | van Daele et al. | 119/53 |

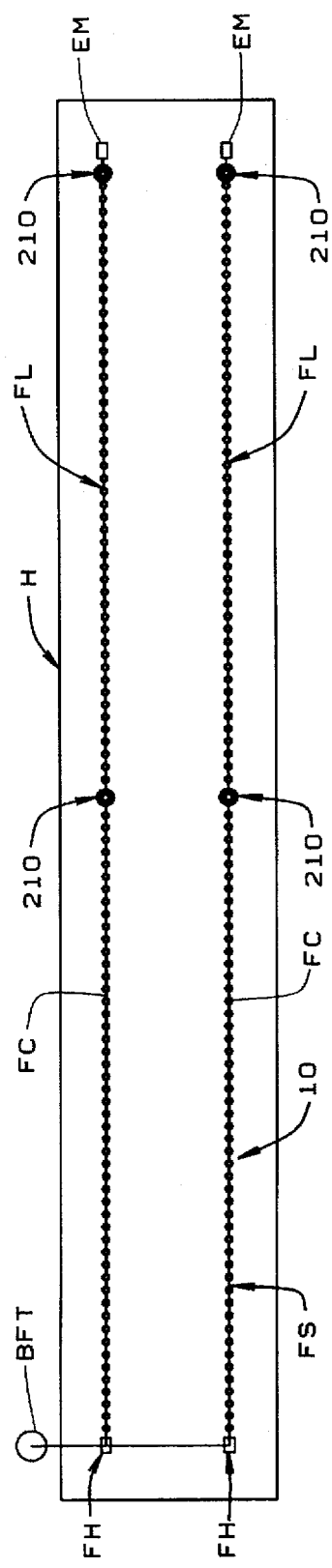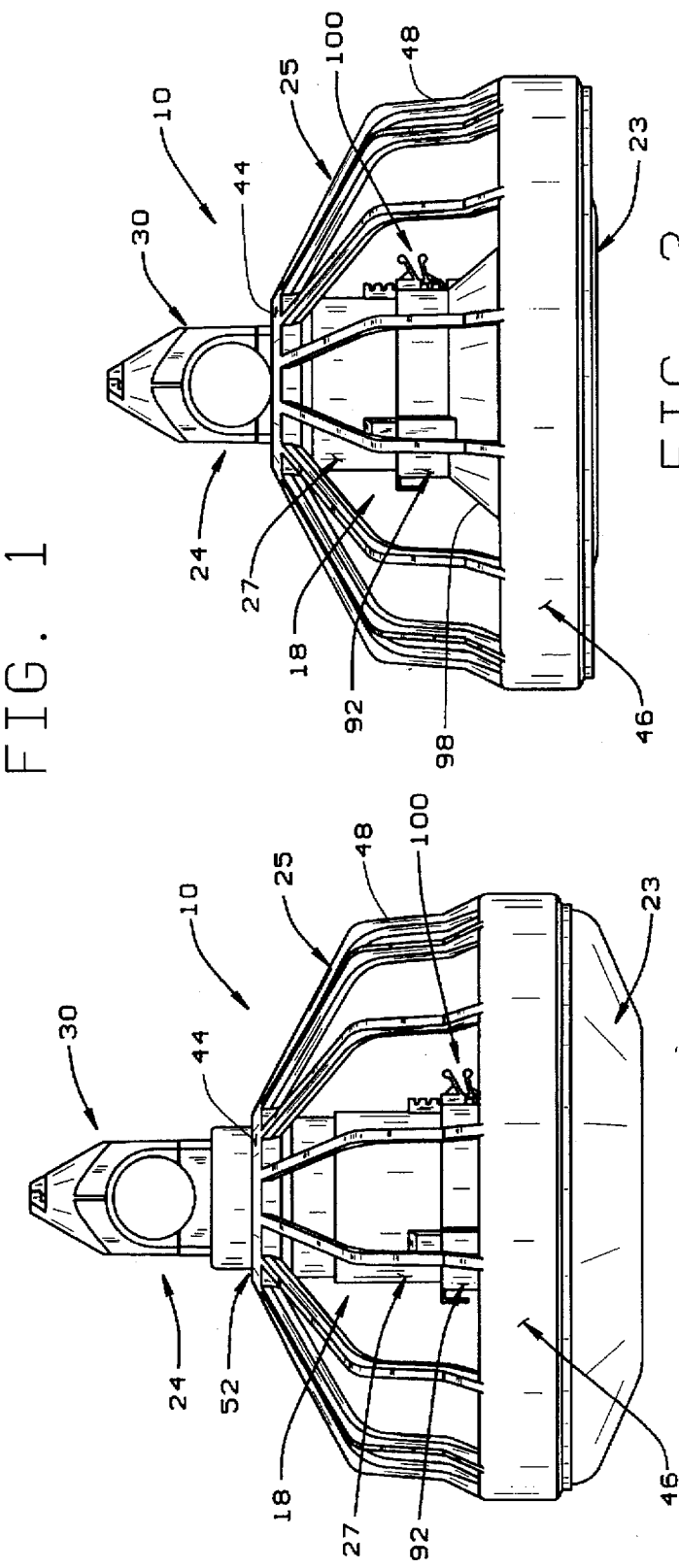

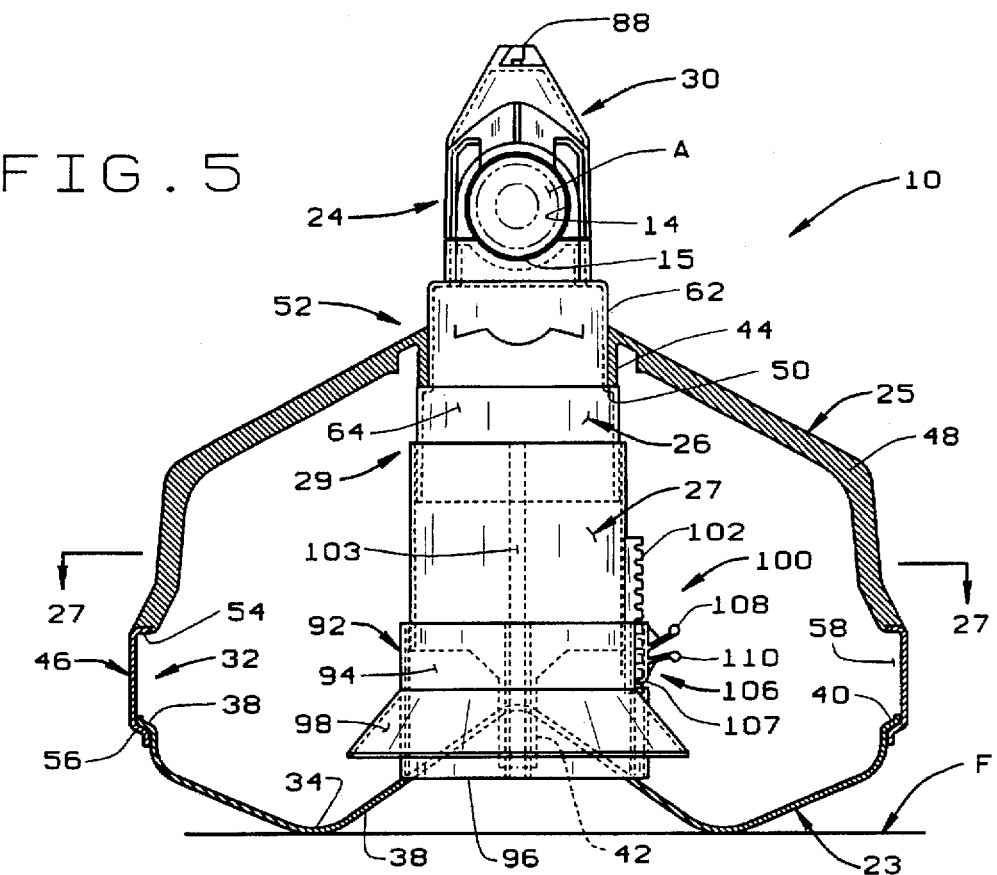
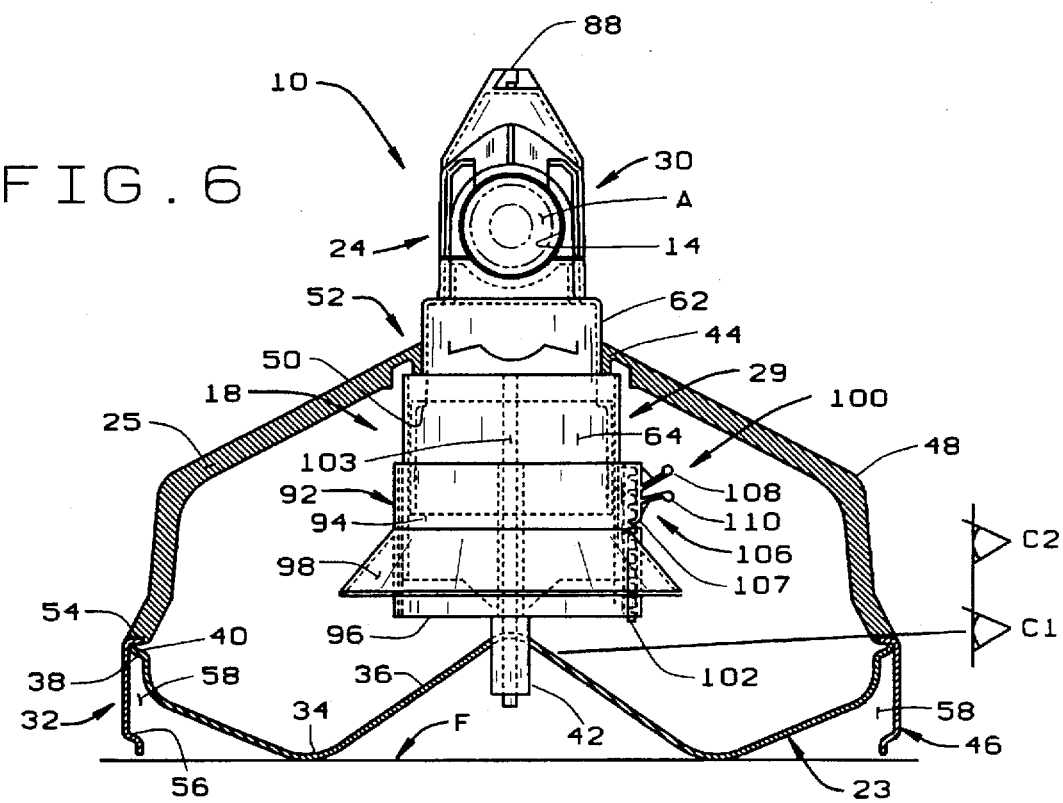

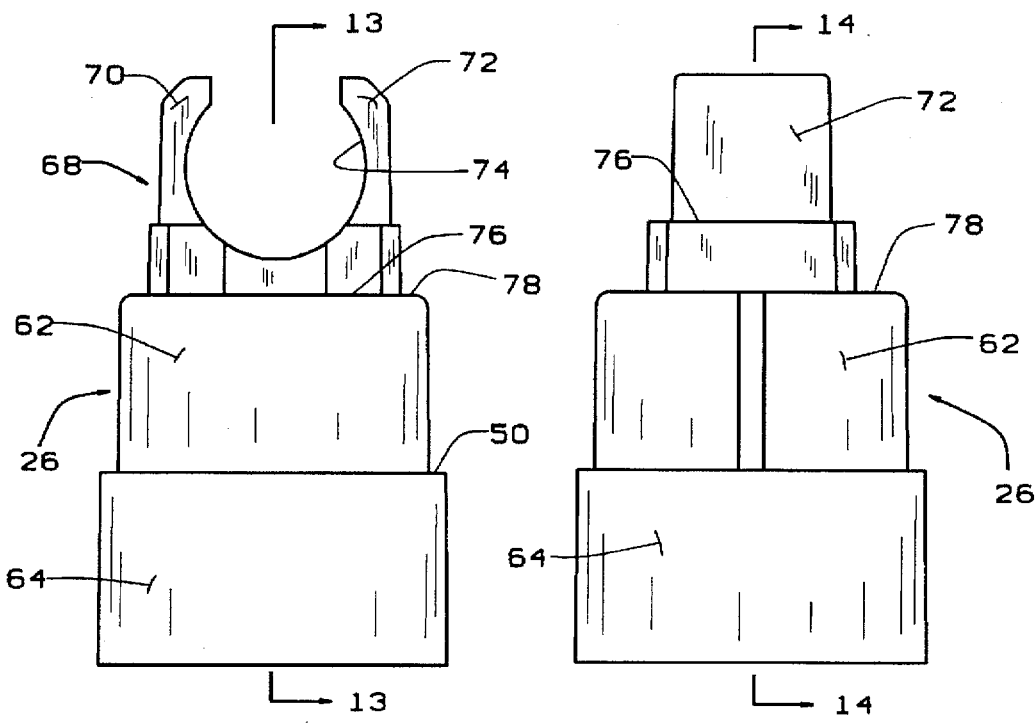
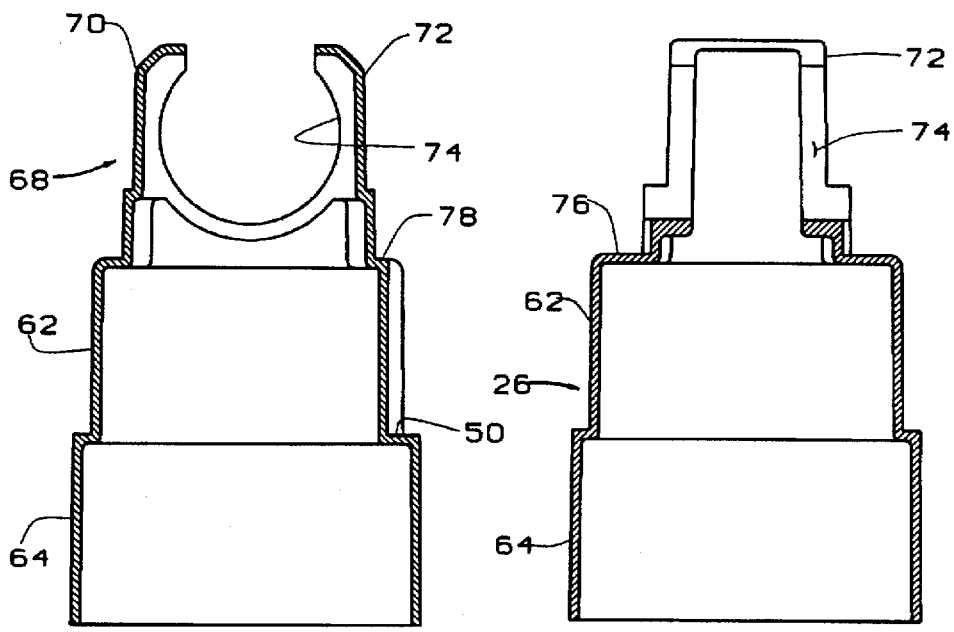

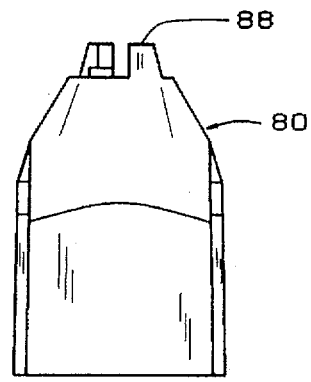
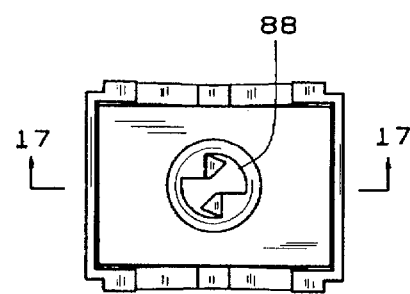
FIG. 15  FIG. 16
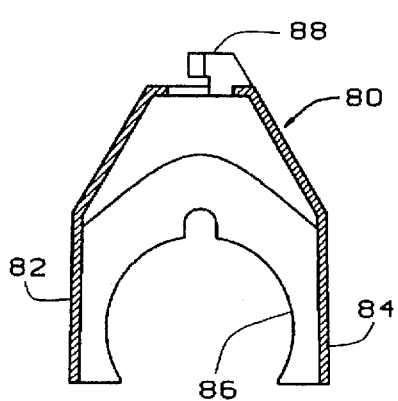
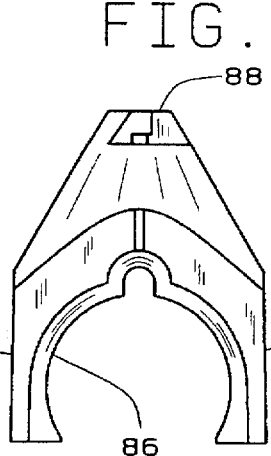
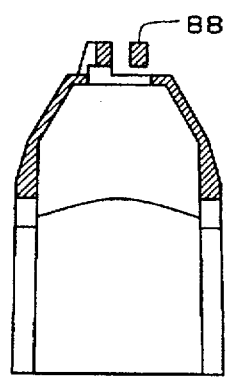
FIG. 17  FIG. 18  FIG. 19
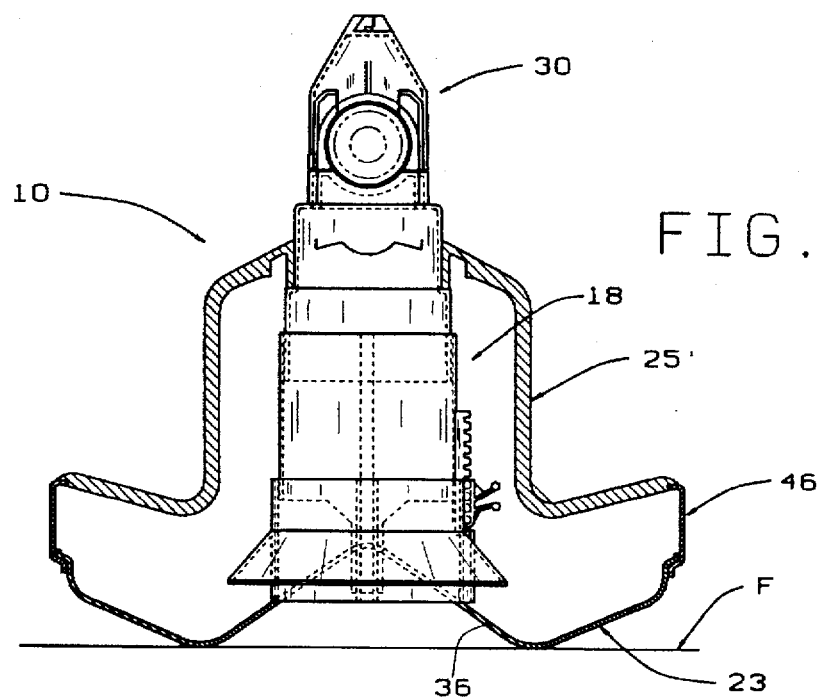
FIG. 20

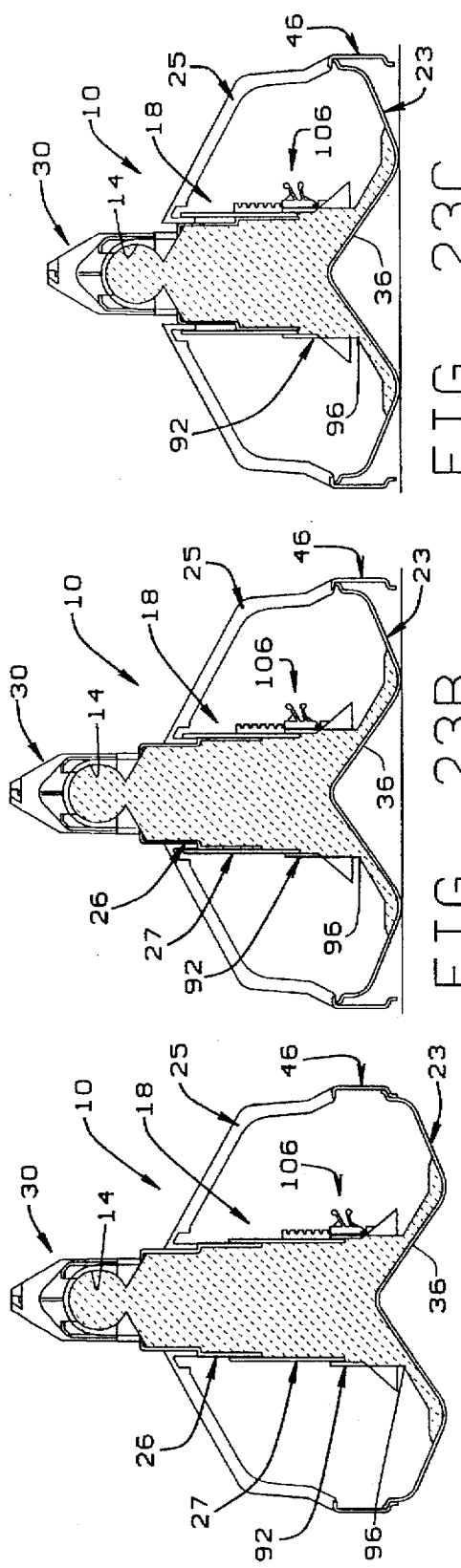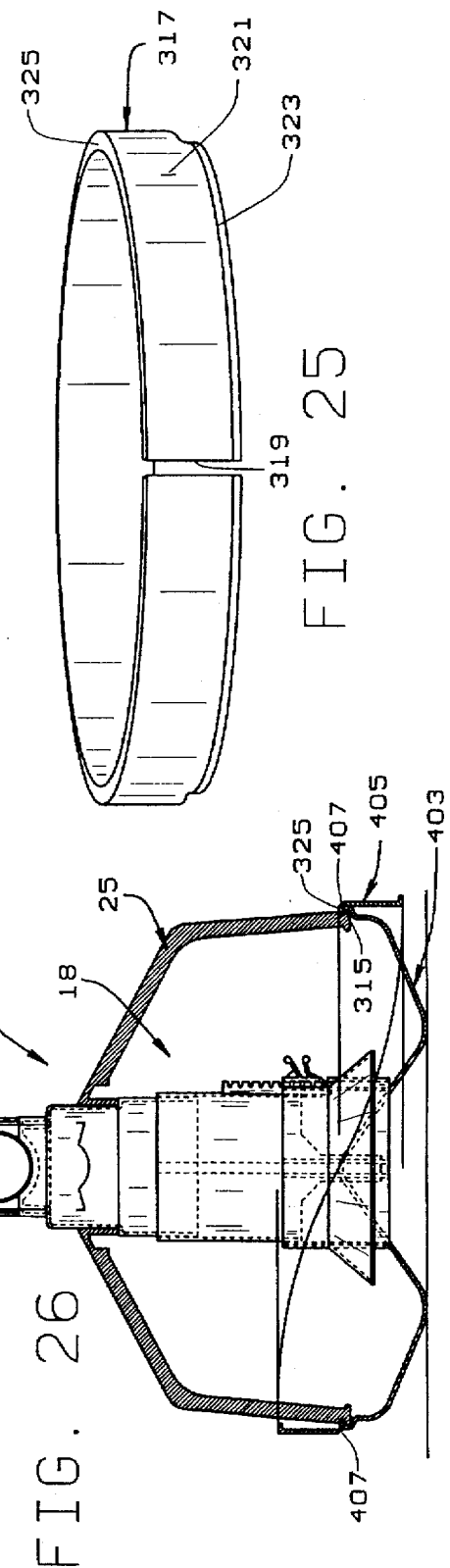

POULTRY FEEDER

CROSS-REFERENCE TO RELATED APPLICATION

This is a continuation of application Ser. No. 08/126,238, filed on Sep. 24, 1993, now U.S. Pat. No. 5,462,017 which is a continuation-in-part of U.S. patent application Ser. No. 07/991,383 filed Dec. 15, 1992, now U.S. Pat. No. 5,311,839.

BACKGROUND OF THE INVENTION

This invention relates to poultry feed systems in which feed is conveyed to a series of feeding stations where it is dispensed for chickens (or other livestock) to eat and, more particularly, to a poultry feeder located at each of the feeding stations which allows young chicks to readily see and to have access to the feed in the feeder, and which is adjustable to retain feed in the feeder and to better accommodate larger birds as the birds mature.

Poultry feedings systems are well-known in the art. Examples of such feeding systems and feeders used in them are disclosed in U.S. Pat. Nos. 5,007,380; 4,476,811; 4,003,339; 3,971,340; 3,598,087; 3,415,228; 3,230,933; and 3,033,163. As shown in these various patents, feed from a bulk feed tank located outside of the poultry house is discharged into a hopper or similar intake receptacle. From there, the feed is conveyed through a conveyor tube to a sequence of spaced feed stations. From the conveyor, feed is deposited into a feed pan at each feed station. In the past, feeders were designed for use by older birds which had grown tall enough to see into and to reach the feed in the feed pan at the bottom of the feeder. For young chicks, it was recognized that these small birds could not see the feed in the feed pan and that the small chicks could not access the feed because the feed pan was often too high. Consequently, upon the introduction of chicks in a poultry house, feed was often simply deposited in piles on the floor of the house (or on a strip of paper laid on the floor) intermediate each of the feeding stations. This allowed the young chicks to see and to eat the feed in the piles, but resulted in substantial spoilage and waste of feed.

In the past, the feed conveyor tube was provided with openings intermediate the feeding stations which, so that prior to introduction of chicks into the house, may be opened to deposit piles of feed between the feeding stations. As shown in U.S. Pat. No. 4,488,509, shallow feed pans were sometimes used to contain the loose feed and to provide access to the chicks. Such shallow feed pans required substantial labor to install in the house prior to introduction of the chicks and still resulted in a substantial waste of feed.

It will be understood that a typical poultry house may be 40–60 feet wide and several hundred feet long. The feed conveyor may run in feed lines or in an endless loop the length of the house such that there are two or more rows of feed stations. The feeders in these feed lines are positioned so as to be relatively close together such at feedings. Typically, there would be about one feeder for every 60–65 birds. There may be several hundred feeders in the poultry house.

Such automated poultry feeding systems typically employed the use of one or more control feeding stations in the feed line to control the operation of the feed conveyor system. These control units were feeders positioned in the feed line at one or more desired locations so as turn on the feed conveyor when the birds had eaten the feed in the feed stations so as to insure that there was feed for the birds at all times. However, if the control unit operated differently than the other feeders in the feed line, or if there would be some difference between the control unit and the other feeders, the birds might well eat less more or less feed from the control unit than from the other feeders such that the amount of feed in the control unit was not representative of the feed in the other feeders.

Feeders were developed which might be usable by both young and more mature chicks. Such feeders are shown in the above-noted U.S. Pat. Nos. 4,476,811 and 5,007,380 which incorporated special windows in their feed drop tube which could be used to flood the feed pan with feed to insure access by the small chicks. While these feeders solved some of the problems, others still remained. One, for example, involved excess feed deposited in the drop tube and in the pan may become stale or off taste to the birds. This may result in the birds not eating as they should with a consequent slower growth rate or a lower conversion of feed into marketable poultry protein. This can lead to waste of the feed and spoilage of the feed.

A second problem involved adjusting the height of the pan so it is accessible by all of the chicks. Pans located at low spots or areas of the poultry house floor will be too high for young chicks to see or to reach into the feed pan. In practice, with a poultry house having a length of about 300 feet or so, it has been found necessary to maintain the level of the litter on the floor relative to the level of the feed line supported overhead to be within a close limit (e.g., 1–2 inches) so as to insure that all of the prior art flood window feeders would properly flood when the feed line was lowered toward the floor. In addition, if variations in floor level relative to the level of the feed line were present, variations as small as 1.5 inches could cause some of the feeders of the line to be properly adjusted for the height of the birds while others of the feeders would be too high for the birds to see the feed in the feeders. This could cause the birds to not feed at the feeders which were too high and to congregate at the other feeders such that too many birds would try to eat from one feeder. This could result in stress and in that birds may not obtain adequate feed rations and some birds may not grow at the desired rates. Also, the feed in the feeders that were too high might be wasted.

Third, the feeders were supported (suspended) from the conveyor tube and the latter was typically suspended from the roof of the poultry house by means of cables and winches such that the entire conveyor along with all of the feed pans may be raised and lowered, as shown, for example, in U.S. Pat. No. 3,033,163. While the height of the conveyor above the floor may be relatively uniform, variations in height still occurred. In feeders such as those described in the noted prior patents, height adjustment of the feeder relative to the floor is non-existent, or limited. Upon lowering the feeders toward the floor, one of the feeders may contact the floor or the litter prior to the others (due to a high spot of the litter on the floor). This may thus place undue weight on this one feeder.

It has also been a problem with prior art poultry feeders, particularly with prior art feeders that use so-called "flood" windows to provide excess feed within the feeder when baby chicks are first placed in the poultry house so as to insure that the chicks are able to visually see the feed in the feeder, that such feeder have large quantifies of feed (e.g., several pounds of feed) which is not consumed by the young chicks, which may become fouled by droppings, and which may go stale. About 10 days into the growing cycle, it is conventional to close these flood windows and to allow feed to flow into the feeder in the conventional way. However, the fouled and stale feed that remains in the feeder causes problems. It will be noted that such stale and fouled feed may contaminate the new feed delivered to the feeder or the birds may have to consume the fouled or stale feed prior to having access to new, fresh feed delivered to the feeder. It has been found that in many poultry operations, the chicks undergo a stall in their growth rate at about the time the flood windows are closed. Similarly, if the chicks were introduced to feed through the use of piles of feed deposited on the floor of the poultry house (as discussed above), at about 10 days into the growing cycle, the birds must be convened from eating from these piles of now stale and fouled feed to feed delivered to the feeder, there has been noted a similar stall in the growth rate of the birds. Such stalls in the growth rate means either that the growing period for the flock must be extended a few more days, or if the birds are marketed at the end of the normal growth period, the liveweight of the birds may be less than desired.

SUMMARY OF THE INVENTION

Among the several objects of the present invention may be noted the provision of a feeder for use in poultry houses which encourages the birds to eat from feeders as early as possible;

The provision of such a feeder by which feed is made visible and accessible to young chicks, thereby minimizing or alleviating the need to deposit feed on the floor of the house so that the chicks could see and have access to the feed;

The provision of such a feeder in which young birds can readily see and have access to the feed in the pan and therefore know where to obtain their food;

The provision of such a feeder in which the height of the feeder is adjustable relative to the height of the feed delivery system above the floor;

The provision of such a feeder in which the position of the pan is loosely supported on the feeder to accommodate variations in floor height relative to the overhead feed line and variations in floor or litter unevenness;

The provision of such a feeder in which the mount of feed delivered to the pan is controlled or regulated so that sufficient feed is always available, but so that excess mounts of feed, which can spoil, is not present in the pan which can be continuously supplied to the feed pan even if the feed conveyor is not operated;

The provision of such a feeder which is readily connectable to a feed delivery system that supplies numerous feeding stations within the poultry house;

The provision of such a feeder employing a hanger by which the feeder may be quickly and easily connected to or removed from the conveyor tube without having to remove any other feeding stations from the conveyor tube;

The provision of such a feeder that employs lost motion linkages to insure visual sighting of and physical access to the feed in the feed pan by young chicks to accommodate irregularities of the floor of the house, and to perform height adjustment;

The provision of such a feeder which is loosely mounted on the conveying tube such that if a larger bird (e.g., a capon or a turkey) bumps into a feeder suspended from the conveyor tube, the likelihood of injury to the bird will be lessened;

The provision of such a feeder in which feed within the feed drop tube is prevented from bridging thus insuring a uniform and constant supplying of feed from the feed drop to the feed pan;

The provision of such a feeder that can be readily installed on and removed from the conveyor tube without removing other feeders from the feed line, without removing the auger from the conveyor tube, and without having to disassemble the conveyor tube;

The provision of such a feeder which presents only so much feed to the birds as can be consumed in a reasonably short period of time such that the feed exposed in the feed pan does not have time under normal conditions to become fouled or stale;

The provision of such a feeder in which no feed is entrapped within the feeder such that it might become stale, but rather all feed in the feeder flows through the feeder from the conveyor to the feed pan;

The provision of such a feeder in which because young chicks are taught to consume directly from the feeder upon the baby chicks rest being introduced into the poultry house without first consuming feed from loose piles of feed deposited on the floor or in chick pans, and because the feeder of the present invention does not allow the feed to become fouled or stale, birds raised with the feeders of the present invention have not experienced the stall in their growth rates (or the magnitude of the stall has been diminished) such that such birds have experienced better growth rates, better mortality rates, and better conversion of feed into poultry liveweight;

The provision of such a feeder which improves the start of young birds by eliminating the start of young birds by starting them directly on feed delivered to the feeders rather than depending on the young birds from feeding from loose piles of feed deposited on the floor of the poultry house;

The provision of such a feeder which enhances the rate at which birds raised with the feeders of the present invention are able to convert feed into poultry liveweight;

The provision of such a feeder which reduces feed waste;

The provision of such a feeder which simplifies cleaning and maintenance of the feeders; and The provision of a feeder in which a hanger assembly for the feeders can be readily retrofitted into existing feeding systems.

A poultry feeder of the present invention is adapted to be installed on a feed conveyor for receiving feed therefrom. The feeder has a connector for installation of said feeder on the feed conveyor, a feed pan for having feed from said conveyor deposited therein, and a feed pan support between the feed pan and the connector including a generally vertically disposed rim proximate the feed pan. The feed pan support permits relative lost motion movement between the feed pan and the rim between a raised position in which the rim extends up above the level of the feed pan thereby to aid in containing feed within the feed pan and a lowered position in which the rim moves downwardly with respect to the feed pan thereby to lower the height of the feed pan.

Alternatively, a poultry feeder system of the present invention is intended for use in a poultry house having a floor, a feeder line including a feed conveyor tube with a multiplicity of feeders mounted thereon. The feeder line is suspended from the roof or the like of the poultry house by means of a lift for raising and lowering the feed line along with the feeders with respect to the floor of the house, wherein each of the feeders comprises a feed drop tube adapted to be connected to the feed conveyor tube for receiving feed therefrom, a feed pan for receiving feed from the feed drop tube, a grill carried by the feed drop tube. The grill has a rim for supporting the feed pan for movement of the feed pan relative to the rim between a raised position in which the rim is raised with respect to the feed pan thereby to aid in preventing birds from raking or billing feed out of the feed pan, and a lowered position in which the feed pan is resting on the floor and in which the rim is moved down with respect to the feed pan so as to allow young chicks to more readily see feed within the feed pan and to permit ingress of the young chicks into the feed pan for access to the feed.

Still further, the feeder of the present invention is to be installed on a feed conveyor, the latter comprising a feed conveyor conduit through which feed is conveyed to one or more of the feeders The feeder comprises a feed pan, a drop tube in communication with the feed conveyor conduit for receiving feed therefrom and for depositing the feed in the feed pan. Means is provided for connecting the feed pan to the drop tube. Additionally, the feeder includes means for adjusting the feed pan between a shallow depth pan position in which the depth of the feed pan facilitates a young chick to readily see feed deposited in the feed pan and a deep depth pan position in which the depth of the pan is such that an older bird may readily eat feed from the feed pan, but is impeded from raking or billing feed out of the feed pan.

Other objects and features will be in part apparent and in part pointed out hereinafter.

BRIEF DESCRIPTION OF THE DRAWINGS

FIG. 1 is a diagrammatic plan view of a poultry house having an automated poultry feed system installed therein for supplying poultry feed from a bulk feed tank on the outside of the house to a multiplicity of poultry feeders of the present invention arranged in one or more feed conveyor lines within the house;

FIG. 2 is a side elevation view of a poultry feeder of the present invention viewed from the side of the feeder in line with the feed conveyor tube, the latter being raised and lowered with respect to the floor of the house by means of cable and winch arrangements or the like, with the feeder shown in its raised, suspended position in which a feed pan of the feeder is just in contact with the floor or is clear of the floor;

FIG. 3 is a view of the feed similar to FIG. 2 in which the feeder is in its lowered, collapsed position in which a young chick just introduced into the house may readily visually see feed within the feed pan of the feeder and have access thereto;

FIG. 5 is a partial cross sectional view of the feeder in its extended or suspended position illustrating the position of the major components of the feeder relative to one another;

FIG. 6 is a view of the feeder similar to FIG. 5, but with the feeder in its lowered or collapsed position;

FIG. 11 (sheet 5) is a from elevation view of the upper portion or the drop tube;

FIG. 12 (sheet 7) side elevation view of the upper portion of the drop tube shown in FIG. 11;

FIG. 13 (sheet 5) is a vertical cross sectional view taken along line 13—13 of FIG. 12;

FIG. 14 (sheet 7) is a vertical cross sectional view taken along line 14—14 of FIG. 11;

FIGS. 15–19 are various elevation and cross sectional views of a cap constituting a part of the hanger/connector of the present invention;

FIG. 20 (sheet 4) illustrates an alternative grill design for use with the feeder of the present invention;

FIGS. 23A–23C are cross-sectional views of the feeder shown in FIGS. 2–7 illustrating the amount of feed (shown by cross-hatched lines) fully filling the drop tube (which serves as a feed reservoir)and the feed discharged out of the bottom of the drop tube and deposited in the feed pan with a substantially uniform layer of feed on the conical central portion of the feeder;

FIG. 25 is a perspective view of a ring adapted to the installed on (or moved up and down on) the grill of the feeder shown in FIGS. 24A and 24B;

FIG. 26 illustrates still another embodiment of the feeder of the present invention in which a shallow depth feed pan is fixedly secured to the grill, the feeder having a ring hingedly secured to the feed pan movable from a lowered position (as shown on the right-hand portion of FIG. 26) such that young chicks may readily see feed deposited therein and in which the young chicks may readily ingress and egress the feed pan, and a raised position (as shown on the left-hand portion of FIG. 26) in which the ring is raised up above the level of the top of the shallow depth feed pan such that larger birds are able to readily feed on the feed in the feed pan but are effectively prevented from raking or billing feed from the feed pan.

Corresponding reference characters indicate corresponding parts throughout the drawings.

DESCRIPTION OF A PREFERRED EMBODIMENT

Figure 4:
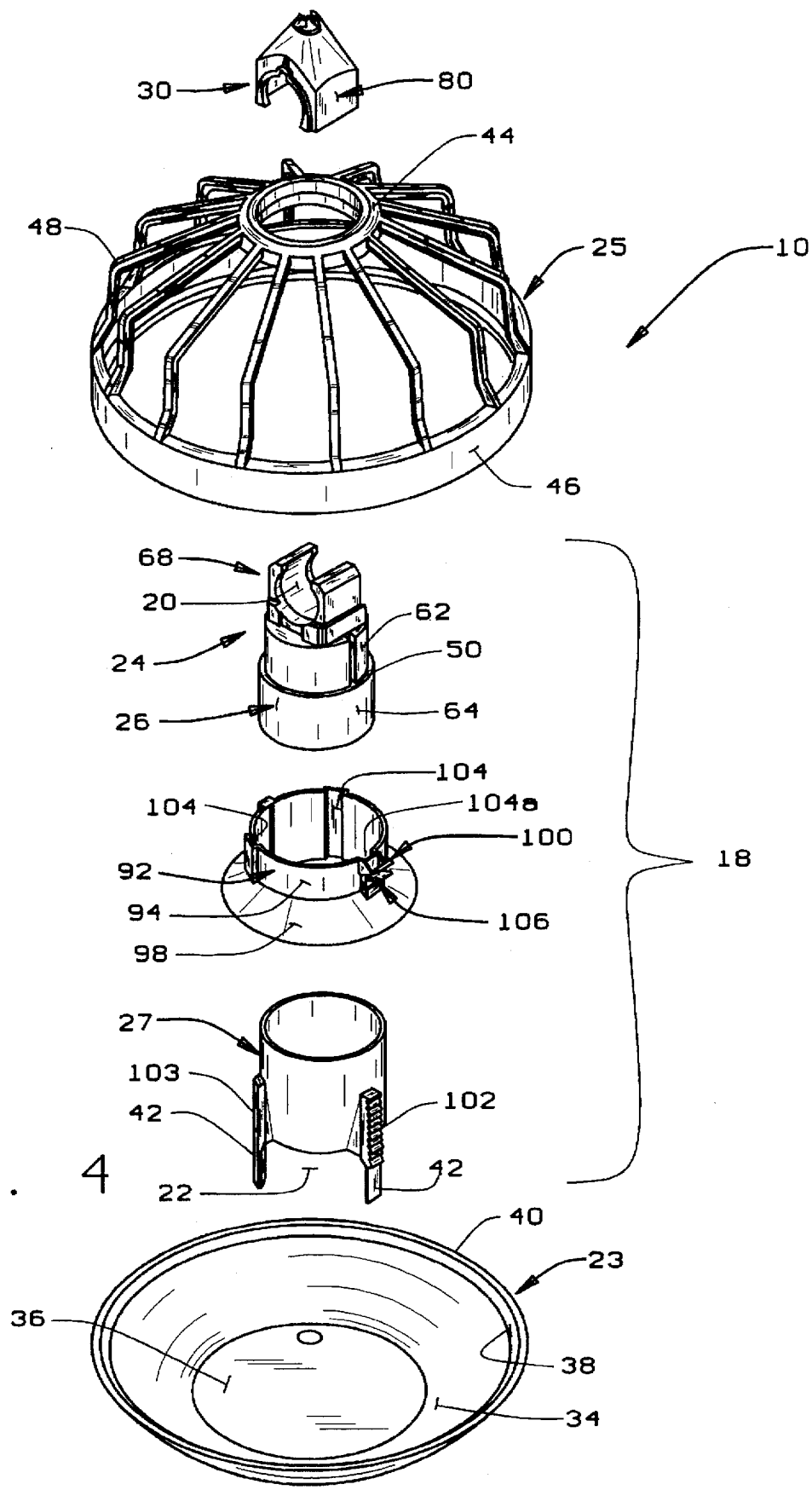
FIG. 4 is an exploded perspective view of the major components of the feeder of the present invention.

Referring now to the drawings and particularly to FIG. 1, a poultry house is indicated in its entirety at H. Typically, such poultry houses are long structures having a length of several hundred feet and a width of about 40–60 feet. For example, a typical poultry house H may have a length of about 300 feet and house about 15,000–20,000 birds. Typically, these poultry houses are equipped with an automated feeding system consisting of one, two, or more feed lines FL which typically run lengthwise of the house. Each of these feed lines has a feed hopper FH which receives poultry feed from a bulk feed tank BFT located outside of the poultry house. Each of the feed hoppers FH is connected to a feed conveyor FC comprising a feed conveyor tube 14 having an auger conveyor A (shown in phantom in FIGS. 5 and 6) therewithin. Auger A may rotatable driven by an electric motor EM within its respective conveyor tube. Alternatively, the auger may be a so-called centerless or flexible auger, such as shown in the prior art U.S. Pat. No. 4,460,230, or other such conveying means. If such flexible augers are used, it will be understood that the feed conveyor FC may be an endless loop within the poultry house with each elongate side of the loop constituting one of the feed lines FL.

Each of the feed lines has a multiplicity of feeding stations FS spaced therealong at substantially equal intervals (e.g., about 2.5 foot intervals). For example, in a feed line having a length of about 280 feet, there may be about 112 feed stations FS. Generally, growers prefer to have about one feeding station FS for every 60–65 grown broilers. Each of the feeding stations FS is herein shown to include a feeder 10 of the present invention.

More specifically, an improved poultry feeder 10 of the present invention is connected in poultry feed system FS such that feed delivered by feed conveyor FC is delivered to a multiplicity of feeders 10. The conveyor tube 14 is typically a horizontal tube suspended from the roof structure of the poultry house by means of a winch and cable mechanism (not shown in its entirety) so that the entire feed line FL including all of the feeders 10 mounted thereon may be simultaneously raised and lowered with respect to the floor F of the poultry house in the manner well known in the art. For example, such a typical winch and cable (or chain) lifting mechanism is described in U.S. Pat. No. 3,033,163, which is herein incorporated by reference. At each of the feeding stations FS located along the length of feed conveyor tube 14, an opening 15 is formed in the bottom of the conveyor tube so as to discharge feed into a respective feeder 10. If the feeder is full, no feed is discharged at that point, and feed will be conveyed to the next feeding station.

In a typical poultry operation, young chicks (perhaps as many as 20,000–40,000 one day old chicks) are introduced into a poultry house H at one time. The house typically has litter (e.g., wood chips) on the floor F. Feed is automatically supplied by means of the feed line FL and water is automatically supplied by automatic watering systems (not shown). Heretofore, small chicks have had a problem seeing the feed in conventional feed pans. To overcome this problem, and to teach young chicks to eat the feed, piles of loose feed were deposited on sheets of heavy biodegradable paper in the space between the feeding stations. After the young chicks learned to eat the loose feed (usually within a few days), additional feed would be supplied to the feed stations by means of the feed conveyor. By that time, the chicks had sufficiently grown such that they were able to see the feed in the feed stations. While this method of introducing feed to chicks worked well, it did result in substantial quantities of wasted or spoiled feed. It is a feature of the present invention that feed in the feed pan of feeder 10 is readily viewable by and is readily accessible to even small chicks thus eliminating or reducing the need for piles of loose feed. In this manner, the amount of spoiled or wasted feed is significantly reduced. It will also be appreciated that by using the feeder 10 of the present invention that the birds are introduced to feed at the earliest possible time from the feeder rather than from piles of loose feed on the floor or from so-called "chick" feed pans.

The major components of feeder 10 are perhaps best shown in FIG. 4. More specifically, feeder 10 includes a centrally located vertical feed drop tube, as generally indicated at 18, into which feed is deposited from opening 15 (as shown in FIG. 5) in conveyor tube 14. Feed drop tube 18 has an inlet 20 at its upper end and a plurality of outlets 22 at its lower end. Feed drop tube 18 is vertically positioned in the feeder for the feed deposited into the tube to fall into a feed pan 23. Feeder 10 also includes a hanger or connector assembly, as generally indicated at 24, for removable attaching feeder 10 to a conveyor tube 14. Further, feeder 10 includes a preferable unitary grill assembly 25 (or other support means) for supporting feed pan 23 relative to feeder 10, and more particularly relative to drop tube 18, and for preventing larger birds from climbing into the feed pan.

More specifically, feed drop tube 18 includes an upper drop tube 26 which is telescopically received in the upper or inlet end of a lower feed level drop tube 27. This telescopic connection of feed tubes 26 and 27 constitutes a first lost motion connection which, as is generally indicated at 29, is shown in FIGS. 5 and 6. The construction and operation of this first lost motion connection will be more fully described hereinafter. The upper end of upper drop tube 26 is removable attachable to conveyor tube 14 by means of hanger assembly 24 in a manner as will also be hereinafter more fully described. Hanger assembly 24 further includes a cap 30 which snaps onto the conveyor tube and locks the upper end of tube 26 in place on conveyor tube 14. As is described hereinafter, upper feed drop tube 26 and lower feed drop tube 27 are telescopically movable relative to each other to provide a lost motion connection by which the height of feeder 10, and, consequently the height of feed drop tube 18 will accommodate changes in height of feeder 10 for purposes as will appear.

Feed pan 23 is connected to upper drop tube 26 by way of a second lost motion connector means, as indicated generally at 32 (see FIG. 5), which permits relative vertical and angular (rocking) movement between the feed pan and the upper drop tube 26. More specifically, this lost motion connection 32 enables relative vertical movement of feed pan 23 and grill assembly 25 (i.e., a support for the feeder pan) between a fully extended position (as shown in FIG. 5) and a collapsed position (as shown in FIG. 6). This lost motion connection 32 also provides an automatic adjustment between the feed pan 23 and unevenness (i.e., differences in the height of the litter on the floor F) or height variations of the floor F of the poultry house relative to the overhead feed line FL. This second lost motion connection 32 does this by compensating for differences in floor height at various locations about the poultry house where feed stations are located, as well as for any unevenness in the floor at the particular location where feeder 10 is installed on the conveyor. This prevents excessive weight from being applied to any one of the feeders 10 as the conveyor tube 14 is lowered relative to floor F if one of the feeders would first encounter a high spot on the floor.

Figure 7:
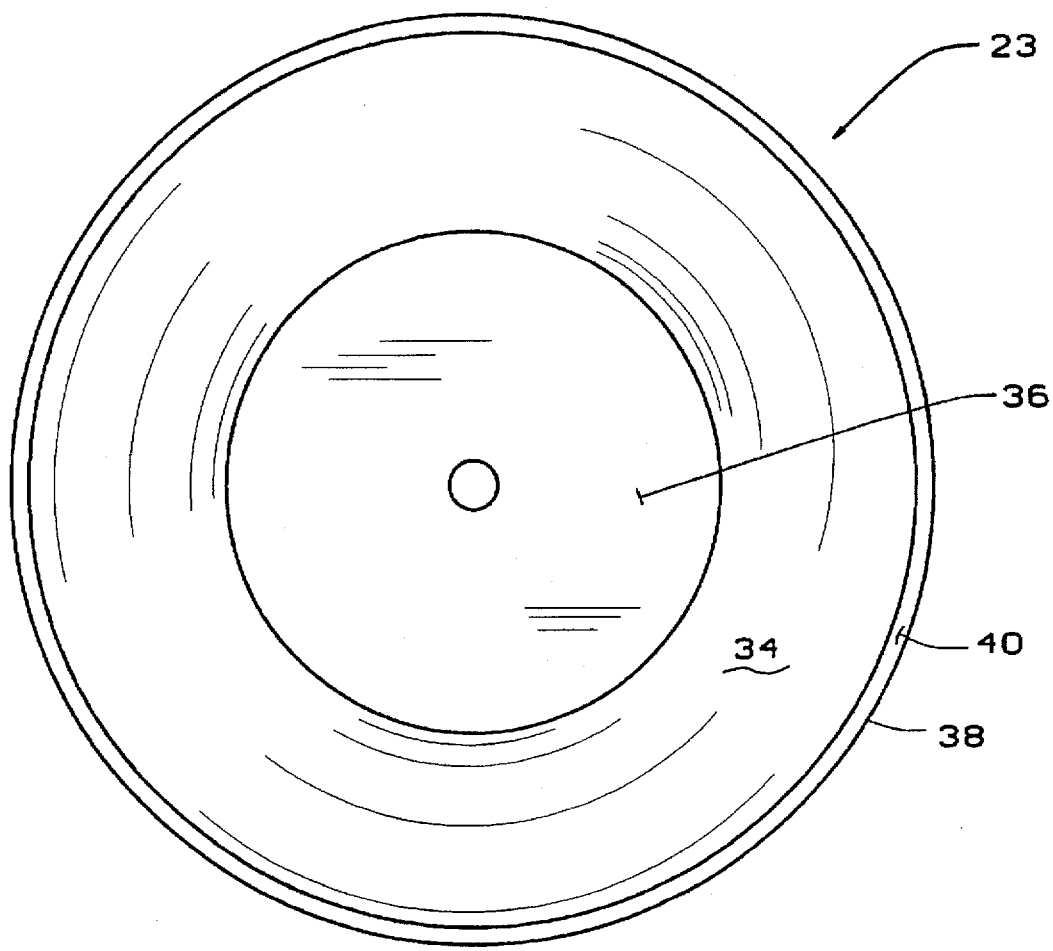
FIG. 7 is a top plan view of the feed pan.
Figure 8:
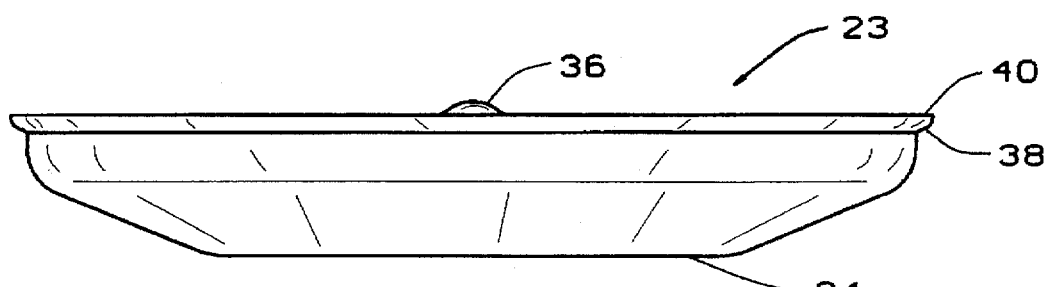
FIG. 8 is a side elevation view of the feed pan.

As best shown in FIGS. 7 and 8, pan 23 is shown to be a shallow, circular pan having a pan base 34, a central conical portion 36 extending upwardly for the pan base, and an upwardly turned sidewall 38. As shown in FIGS. 5 and 6, and as will be more fully described hereinafter, pan 23 is so shaped and sized that when feeder 10 is in its fully collapsed position (FIG. 6), a young chick having its eye at eye level C1 can see the feed in the pan while the chick is standing on floor F. Further, the height of sidewall 38 is such that a young chick may readily have access into the feed pan to eat the feed therein. An outwardly extending circumferential flange 40 is formed at the upper end of side wall 38.

Conical section 36 is generally aligned with the longitudinal centerline of feed drop tube 18. As shown in FIGS. 4-6, the bottom of the lower feed tube 27 has legs 42 extending down between openings 22 with these legs resting on the conical section. Thus, feed delivered into feed drop tube 18 from conveyor tube 14 drops through the feed drop tube and flows through outlets 22 and is discharged onto conical section 36 and into the bottom of pan 23. The slope of the conical center section 36 of the feed pan is shown to be equal to (or preferable somewhat greater than) the angle of repose of the feed such that the conical surface distributes the feed out within the feed pan toward the rim of the feed pan so as to provide access to the feed by the birds, and the conical center 36 becomes covered with a uniform layer of feed thus maximizing the viewing surface of the feed in the pan, as seen by the birds. It will be understood that a variety of different feeds may be used in poultry operations and that the angle of repose of the feed may vary between about 25° and about 45°. Conical portion 36 is shown to have a slope of about 35° so as to approximate most feeds.

Figure 9:
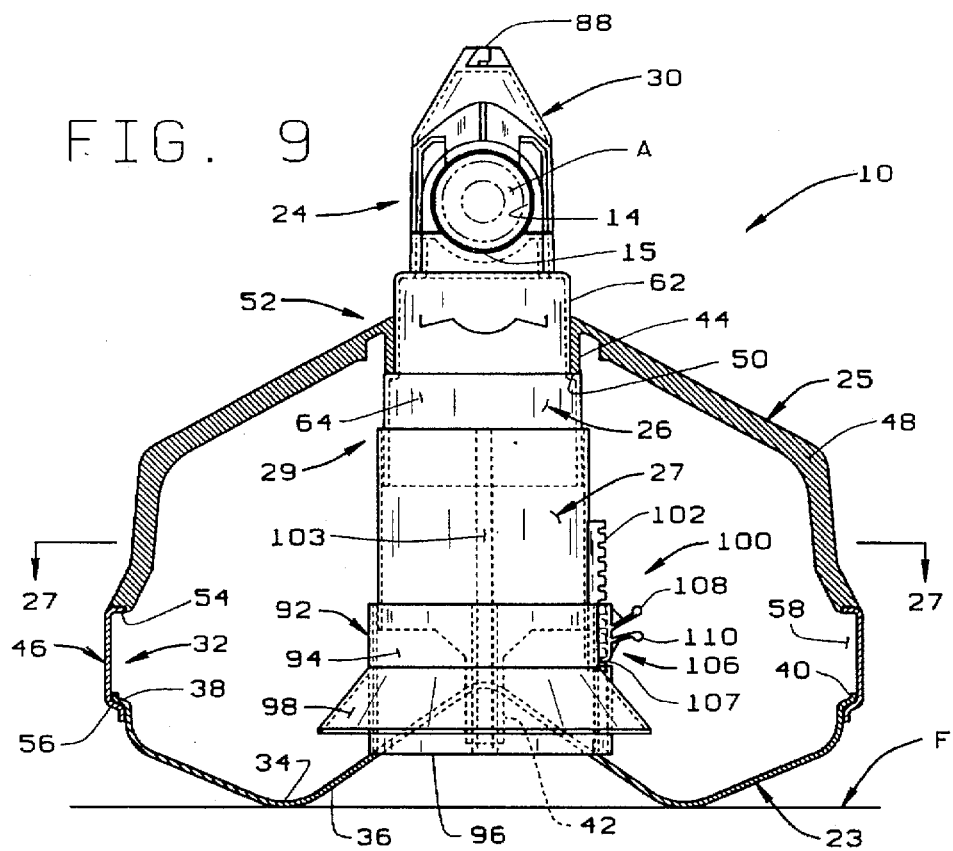
FIG. 9 is a partial side elevation view of the top portion of the drop tube with some parts shown in cross section illustrating the manner in which the grill is mounted on the drop tube so as to enable vertical and rocking movement of the grill on the drop tube.
Figure 10:
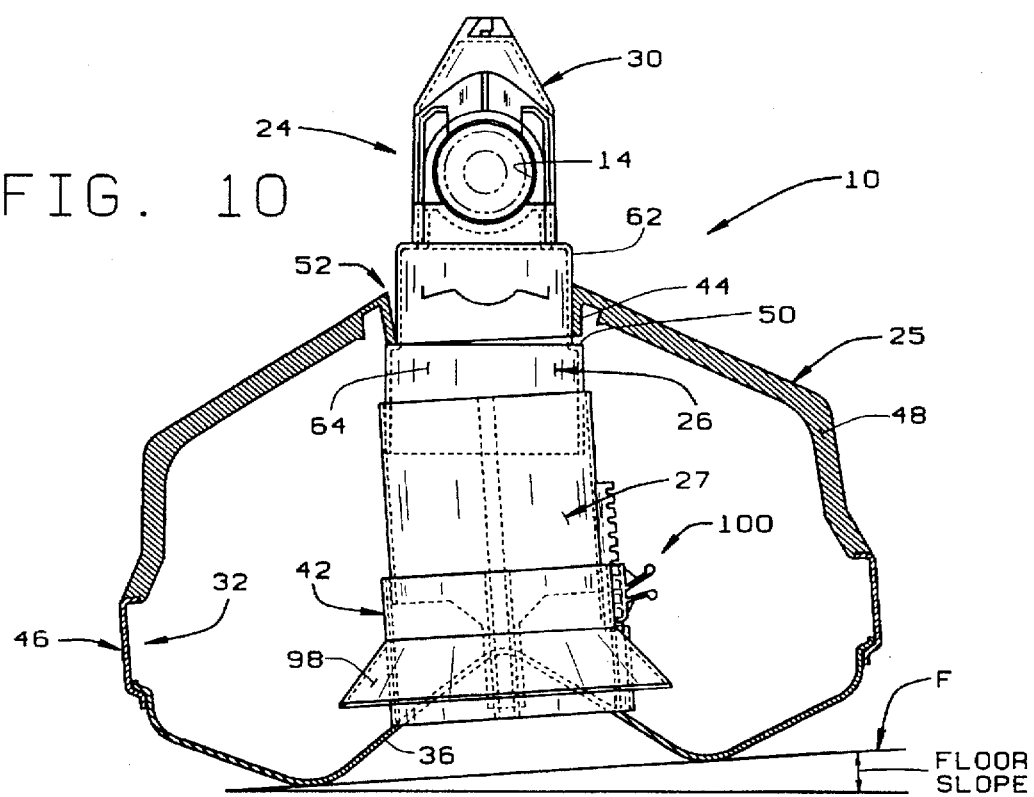
FIG. 10 is a view similar to FIG. 9 illustrating the grill in a rocked or tilted position with respect to the drop tube.

The above-noted second lost motion means 32 includes grill assembly 25. The later, as shown in FIGS. 2–6, includes an upper collar 44, a lower circumferential rim 46, and a plurality of ribs 48. Preferably, the grill and its components are integrally molded of a suitable plastic. Collar 44 is sized to be loosely received on upper feed tube 26. Feed tube 26 has a shoulder 50 formed approximately midway of its length. Collar 44 at the upper end of the grill assembly bears or rests on shoulder 50 of tube 26 such that the grill and feed pan 23 are supported (suspended) therefrom when feeder 10 is in its fully extended or suspended position, as shown in FIGS. 2 and 5. It will be appreciated that as conveyor tube 14 is lowered toward floor F, and as the feed pan engages the floor, a third lost motion connection, as indicated at 52, between the grill collar 44 and tube 26 permits the collar to move both upwardly (as shown in FIGS. 2 and 3) and angularly (as shown in FIGS. 9 and 10) with respect to tube 26.

As shown in FIG. 4, grill assembly 25 has a plurality of equal angular spaced ribs 48 extending from collar 44 to the lower circumferential rim or ring 46. The number of ribs and their spacing is variable. However, they preferably are spaced sufficiently far apart such that small chicks can readily climb into the pan and such that larger birds can insert only their heads between adjacent ribs to get access to the feed.

As shown in FIGS. 5 and 6, rim 46 has spaced inwardly extending flanges or shoulders 54 and 56 at its upper and lower ends, respectively. These flanges, together with the inner circumferential wall of the rim 46 form a groove 58. Flange 38 and lip 40 of pan 23 are received within groove 58 of grill rim 46 such that the pan is movable within the groove for both vertical and angular (both rocking and rotational) movement thus permitting the pan to freely move between its raised or extended position (as shown in FIGS. 2 and 5) in which pan flange 38 rests against lower flange 56 of grill rim, and its collapsed position (as shown in FIGS. 3 and 6) in which flange 38 bears against upper flange 54 such that the grill and its rim 46 can move downwardly with respect to pan 23. The flange 38/rim groove 58 arrangement thus constitutes a lost motion connection 32 between feed pan 23 and rim 46 of grill 25. However, those skilled in the art will recognize that within the broader aspects of this invention the grill serves as a support between feed drop tube 26 and feed pan 23 and is a grill per se, not necessary for lost motion connection 32. Further, grill 25 may have other configurations, such as is indicated at 25' in FIG. 20 (sheet 4). This alternate grill 25' can be used to enable the lost motion of the pan and of the grill relative to the feed drop tube in the manner herein described, but the grill 25' is the equivalent of a so-called grilless feeder.

This second lost motion connection 32 permits both vertical and rotational (or rocking) movement of pan 23 with respect to rim 46. Thus, upon lowering of feed pan 23 onto floor F and upon further lowering of conveyor tube 14, the effective height of feed pan 23 (i.e., the height of feed pan side wall 38 plus the height of rim 46) can be decreased to essentially the height of the feed pan flange. As shown in FIG. 6, this allows a young chick C1 to readily see feed in the feed pan and to readily climb into the feed pan for access to the feed, and to easily egress from the pan.

Upon the chicks growing and increasing in height, all of the feeding stations 10 of one of the feed lines FL may be raised as a unit along with conveyor tube 14. As the conveyor tube is lifted by the above-mentioned winch and cable lifting arrangement, lost motion connection 60 effectively raises rim 46 relative to feed pan which at least initially remains on floor F. With the height of feed pan 23 raised, the larger birds will still have access to the feed while standing on floor F, but the birds are prevented from raking or scattering feed out of pan 23.

Further, upon lowering the feed conveyor line 14 so that the feed pans 23 rest on floor F, lost motion connections 32 and 52 of each of the feeders 10 in the feed line FL enable the base 34 of each of the feed pans 23 to rest on the floor F of the poultry house, even if there are sharp variations (at least within a limited range) in floor height or litter eveness from one feeder to another, for example about 1–2 inches. Thus, even if the floor or the litter is uneven, pan 23 of a feeder 10 can rest on the floor at an angle while conveyor tube remains horizontal without imposing undue strain on the feeder or without one (or only a few of the feeders) supporting an undue share of the weight of the feeder line FL.

In addition to the feeder pan 23 being able to incline with respect to rim 46 as above described, it will be understood that by tilting the feeder pan with respect to the rim, the feeder pan may be readily "snapped" out of engagement from the rim for cleaning or replacement purposes. This can be done manually in a matter of seconds, without the necessity of disassembling the feed line FL and without the use of even simple hand tools.

As shown in FIGS. 9 and 10, the inner diameter of collar 44 is slightly greater than the diameter of the upper portion 62 of feed tube 26 above shoulder 50. As illustrated, this relation of the collar 44 being so supported on shoulder 50 permits the grill 25 to rock in any direction on shoulder 50. This means that upper drop tube 26 will remain vertical (as shown in FIG. 9) if the floor is not level as the feeder 10 is lowered to rest on the floor. Further, this connection of the grill to feed tube 26 permits the grill assembly 25 and the feed pan 23 to readily tilt or give if a large bird (i.e., a turkey) bumps into a suspended feeder thereby possibly preventing injury to the bird. In addition, because collar 44 bears on shoulder 50 (which has a diameter of about 3 inches or so), the grill is normally supported in a level, neutral position, as shown in FIG. 9. Upon the grill and feed pan being bumped by a large turkey or the like in any direction, the grill and feed pan are free to rock in any direction relative to the feed tube 18. Of course, the weight of the feed pan and the grill will tend to restore the grill and the feed pan to its normal level position with the collar 44 bearing flat on shoulder 50. This restoring force is beneficial because it has been heretofore found that conventional feeders are bumped by turkeys or the like and where the feed can swing on the conveyor tube, the feed in the feed pan may shift to the "low" side of the tipped feed pan. This causes the feed pan to hang in a tilted position. Upon more feed being dispensed into the feed pan, this non-level position will be aggravated such that the pan becomes significantly tilted which may have an adverse affect in that birds may not be able to feed from the tilted pan, or the tilted pan may spill feed. In contrast, the feeder of the present invention, being restored to its level position insures that as additional feed is added to the feed pan from the conveyor, the feed in the pan will be re-leveled thus minimizing the tilt of the feed pan. It will be appreciated that the amount of the restoring force is dependent on the diameter of collar 44 and of shoulder 50—the bigger the diameter of the collar, the more restoring force. Of course, there are practical limits to the maximum diameter of the collar. It has been found that collar of about 3 inches or so is preferred for chicken feeders while collars of larger diameter may be preferred for larger birds, such as turkeys.

As heretofore described, hanger/connector assembly 24 includes feed tube 26 and cap 30. Feed tube 26 is open at its upper end for receiving feed from opening 15 in feed conveyor tube 14. The lower end of feed tube 26 is larger in diameter than the upper end, with the transition from the upper and smaller diameter section 62 to the lower and larger diameter section 64 being at shoulder 50.

Referring now to FIGS. 4, and 11-14, the hanger/connector 30 is shown to comprise a saddle 68 formed on the upper end of feed tube 26. The saddle is generally U-shaped and is defined by upwardly extending, spaced legs 70 and 72 formed integrally with feed tube 26 (which as previously noted is preferably molded on a suitable plastic material). The inner face of each leg has a concave curvature 74 corresponding to the diameter of conveyor tube 14. The saddle extends upwardly from a top face 76 of feed tube 26. The length and width of this top face is slightly larger than that of the saddle so that a horizontal shoulder 78 is formed around the outside of the base of the saddle. As best shown in FIG. 12, the body of saddle and of upper drop tube 26 is hollow so that feed from opening 15 of conveyor tube 14 is free to drop from the conveyor tube into the interior of drop tube 18 and into feed pan 23 of feeder 10.

The upper ends of legs 70, 72 are spaced apart a distance somewhat less than the diameter of conveyor tube 14. Since feed tube 26 and saddle 68 are preferably integrally molded of a suitable plastic material, the legs are resiliently movable away from each other when, with the saddle clear of conveyor tube 14, the conveyor tube is brought into contact with the inner edges of the legs and the conveyor tube is forcibly moved toward the base of the saddle. This exerts a camming action on the legs tending to spread them apart thus allowing the saddle to be snapped onto the conveyor tube. In this manner, a feeder incorporating the hanger/connector 24 of the present invention may be selectively installed in any desired location on the conveyor tube without requiring the removal or adjustment of any other feeders from the feed line.

Hanger/connector 24 further includes a cap 80 which is best shown in FIGS. 4 and 15-19, which is designed to fit over legs 70, 72 of saddle 68 after the feeder has been installed on conveyor tube 14 so as to secure or lock the feeder 10 in place on the conveyor tube. Cap 80 is preferably integrally molded on plastic or the like and has an upper base section 82 with two spaced apart arms 84, 86. Like saddle legs 70, 72, the cap arms 82, 84 have a part circular inner surface 88 for cooperating with conveyor tube 14. The ends of cap arms 82, 84 are spaced apart a distance less than the diameter of the conveyor tube 14. Thus, when the cap arms are forced onto the saddle legs 70, 72, the ends of the cap arms are cammingly spread apart by the conveyor tube such that the cap is snapped onto the conveyor tube. Further, the hanger/connector 24 effectively seals the conveyor tube at the location of the feeder 10 thus preventing the leakage of feed from the hanger/connector. It will be appreciated that with the cap 80 snapped in place on the conveyor tube, the feeder is suspended from the conveyor tube and is free to rotate about the conveyor tube. However, the feeder is gravity biased to assume a position where the feeder is substantially below the conveyor tube.

Cap 80 is hollow and is sized and shaped to fit closely over saddle 68 and to be snap locked onto the upper end of tube 26 to hold the cap in place thereon. Cap 80 is provided with a shock wire guide 88 on its upper face for receiving and holding an electric shock wire (not shown) which is conventionally used to prevent birds from roosting on the conveyor tube 14.

As noted above, cap 80 fits snugly with the legs 70, 72 of saddle 68 so as to positively secure feed tube 26 to the conveyor tube 14. It will be appreciated that when cap 80 is installed on the saddle, the force required to pull the feed drop tube 26 from the conveyor tube is drastically increased.

It will also be appreciated that if the connector 24 of the present invention is employed, feeding stations 10 may be installed on and removed from conveyor tube 14 without removing the other feeders from the feeder line FL, without disassembling the conveyor tube 14, and without requiring the use of even simple hand tools. Also, existing feed stations as manufactured by a variety of manufacturers may be modified or retro fitted with feed drop tubes 18 of the present invention having hanger/connector 24 incorporated therein. Thus, existing feeders may be readily modified for ready installation on and removal from their respective feed conveyor tubes. This retrofitting of existing feeders may be accomplished one at a time as required in the poultry house operations, or an entire feed line FL may be converted. To retrofit a single prior art feeder with the hanger/connector 24 of the present invention, the existing feeder is removed as expeditiously as possible from the feed conveyor. For example, the hanger of the existing feeder (which is typically made of plastic) may be cut from the conveyor tube 14. Drop tube 18 of the present invention is so designed that it may be used interchangeably with drop tubes and feeders from other feeder manufactured by a variety of poultry feeding equipment manufacturers. It will be appreciated that drop tube 18 may be sold independently of feeder 10 of the present invention for being retrofit into existing feeders that a grower may have on hand.

Referring to FIGS. 5 and 6, lower feed tube 27 has a uniform diameter along its length. As noted above, there are three (or more) outlet openings 22 formed in the base of the tube with the sidewalls of the outlet openings being defined by legs 42. The bottom of each leg 42 rests upon conical section 36 of feed pan 23 so as to define feed discharge openings for feed drop tube 18.

To control the amount of feed spread onto conical section 36 and discharged into feed pan 23 for consumption, the feeder 10 includes an outer feed level control tube, as indicated generally 92, which is installed over and which is axially movable with respect to lower feed tube 27. Outer tube 92 includes a cylinder wall 94 whose inner diameter is somewhat larger than the outer diameter of lower feed tube 27 such that cylinder wall 94 fits over the tube. The cylinder wall is substantially shorter than the feed tube. Wall 94 has a lower edge 96 as shown in FIG. 6). Outer tube 92 further has a circumferentially extending anti-raking skirt 98 formed on the outer face of the cylinder. Skirt 98 flares outwardly from its upper end and terminates slightly above the bottom of cylinder 92. This anti-raking skirt discourages birds from picking at feed through openings 22 which is still contained within feed tube 18.

To control the amount of feed deposited in pan 23, the position of the lower edge 96 of cylinder wall 94 relative to outlets 22 of feed tube 23 is adjusted. By uncovering more of openings 22, more feed from within feed drop tube 18 will be discharged into the feed pan. A pawl/rack mechanism 100 allows this adjustment and locks the cylindrical wall 94 in a desired axial position on feed tube 27. As shown in FIGS. 5 and 6, a rack 102 is integrally formed on one of the legs 42 of lower feed tube 27. The lower end of the rack extends along the leg below the upper end of the feed outlet openings 22. As best shown in FIG. 4, the legs 42 comprise raised surfaces 103 on the outer face of the feed tube. The rack is formed on the outer surface of one of the raised leg portions on lower tube 27.

As shown best in FIG. 4, grooves 104 are formed on the inner surface of outer tube 92 for receiving the legs 42 of lower tube 27. One of the grooves, as indicated at 104a, is adapted to receive rack 102. In that manner, it will be understood that outer tube 92 is free to move axially along the length of lower tube 27 and, due to the raised leg 103 and rack 102 portions on the outer surface of tube 27 being received in grooves 104 and 104a of outer tube 92, the latter is restrained from rotating on lower tube 27, but is free to move axially therealong. A pawl 106 (as best shown in FIGS. 5 and 6) is formed on outer tube 92 at so as to be movable (bendable) about a hinge point molded into the pawl between an engaged position (as shown in FIGS. 5 and 6) and a raised or released position (not shown) such that with a pawl finger 107 in its engaged position the outer tube 92 is fixed with respect to lower tube 27 and with the pawl in its released position, the outer tube and the anti rake ring 98 may be readily adjusted along the length of the lower tube 27 so as to regulate or control the flow of feed from outlet openings 22 in the lower end of tube 27 into the feeder pan. The pawl includes upper and lower outwardly extending finger tabs 108, 110, respectively, which permit the ready release of pawl finger 107 from the teeth of rack 102 and serve as a handle for the ready, manual adjustment of the outer tube 92 on lower tube 27. Accordingly, when it is desired to adjust the flow of feed out of openings 22, the finger tabs 108, 110 are pinched together which releases pawl finger 107 from rack 102 thus enabling axial movement of the outer tube on the lower tube. After moving the outer tube 27 upwardly or downwardly, the finger tabs are released and the pawl finger resiliently returns to its normal position engaging the rack thereby to lock the outer tube in place.

Vertical adjustment of the lower edge 96 of cylinder wall 94 effectively changes the area of feed discharge openings 22 and regulates the feed flowing into pan 23. If the lower edge 96 is raised, more of the outlet openings are exposed and more feed is delivered to the pan. As the feed flows down the side of cone section 36 of the feed pan and cascades into the pan, it comes to rest such that it forms an angle with respect to the bottom of the pan. The slope of the feed depends on the height of lower edge 96 and the angle of repose of the feed. With the outer tube in a raised position, the amount of feed in the pan is maximized. If the feed is rapidly consumed by the poultry, additional feed stored within feed drop tube 18 will constantly replace that eaten. It will be understood that the feed in drop tube 18 serves as a feed reservoir. If, on the other hand, the feed tends to remain in the pan a long time, the question of freshness or spoilage (with consequent waste and lower conversion by the birds) arises. To regulate the amount of feed available for consumption, the lower edge 96 can be raised or lowered. This makes the amount of the feed in the pan more shallow than before and insures that less feed is deposited into the pan. However, to the birds visually seeing the feed, it will appear as if a full ration of feed has been dispensed. If the lower edge 96 is already in a lowered position and the pan tends to be constantly empty, or nearly empty, it means the feed is being consumed faster than thought. Raising the lower edge 96 then increases the amount of feed discharged such that a greater quantity of feed is available in the pan. Alternatively, the feed conveyor can be operated more frequently to deliver feed more often.

Also, with the construction of feed drop tube 18, as above described, it will be understood that a wide range of feed dispensing settings are available to the grower by merely adjusting outer tube to cover or uncover openings 22 as required. Further, the height of openings 22 (once outer tube is in a set position) are constant with respect to the conical projection 36 of the feed pan throughout the range of movement of the feeder from its collapsed to its fully extended positions. Thus, if the outer tube is not adjusted, the same amount of feed will be presented to the birds as the feeder's height is adjusted.

It will be appreciated that as feed flows out of openings 22 and into the feed pan 23, at some point the amount of feed in the pan will block the flow of any additional feed from the openings. The continued delivery of feed to the feeder 10 will cause feed drop tube 18 to become filled. When the drop tube is filled, the feed therein serves as a reservoir. Continued operation of the conveyor after a feed drop tube has been filled causes the feed in conveyor tube 14 to be passed along to the next successive feeder until all of the feeders in the feed line FL have been filled and until the conveyor tube between each of the feeders is charged with feed. Thus, upon restarting of the conveyor, feed within the conveyor tube between each of the feeders will be initially delivered simultaneously to all of the feeders so as to prevent birds from congregating at one or at a few of the feeders which are first to receive fresh feed upon start-up of the conveyor.

With feeder 10 having discharge openings 22 at the bottom end of feed tube 27, it is insured that feed is discharged into the pan on a "first in, first out" basis and that no feed remains trapped within the feeder or the feed tube 18.

Referring now to both the upper tube 26 and the lower tube 27 of drop tube 18, especially as shown in FIGS. 5, 6, 13, and 14, it will be noted that the diameter of drop tube 18 progressively increases from the top to the bottom. This progressive increase in drop tube diameter results in lessening the tendency of feed within the drop tube from bridging (sticking) within the drop tube so as to facilitate the steady and uninterrupted flow of feed to the feed pan, even as the feed is slowly eaten by the birds such that feed from the interior of the feed tube will slowly flow therefrom so as to replenish the feed in the feed pan.

With regard to the lost motion connection 32 between the lower end of grill assembly 25 and pan 23, the distance taken up by the arrangement is the distance measured between upper and lower rim surfaces 54 and 56 of rim 46. In essence, the rim is allowed to drop to or below the upper level of the upper edge 40 of feed pan 23. The height of the feed pan and the height of the rim are sized so, when the rim is in its lowered position (as shown in FIG. 6), as to permit very young chicks to visually see the feed within the pan with the rim lowered and so that the young chicks can readily access the feed by climbing into the feed pan. As the birds grow in height, the conveyor tube 14 may be raised by the cable and pulley lifting arrangement and the lost motion connection 32 will initially lift the rim 46 relative to the pan 23 which may remain resting on floor F until all of the lost motion of lost motion connection 32 is taken up. This has the result of effectively increasing the height of the feed pan so as to prevent the now larger birds from wasting feed by raking feed out of the feed pan and out of feed tube 18.

It will be further appreciated that with the feeder 10 of the present invention in its lowered position, that the length of feed tube 18 is minimized. Since the feeder is intended to be in its lowered position when the birds are the smallest (and when they consequently eat the least mount of feed), the volume of feed contained within the feed tube is also minimized. In turn, this minimizes that amount of feed held in the feed tube that may go stale or off flavor. As the birds grow in size and begin to consume feed at a higher rate, the feeder 10 is adjusted to its more fully extended position (as shown in FIG. 5) thus also increasing the volume of the feed tube with a consequent increase in the volume of feed in the feed tube so as to constitute a greater feed reservoir. This insures that ample feed is present in the feeder at all times.

Still further, with feeders 10 of the present invention, it will be appreciated that young birds are trained from their initial introduction into the poultry house to consume feed from the same type of feeder and from the same feed cycle throughout their entire growing cycle. The birds are not required to make a transition from feeding from piles of loose grain to a feeder. Nor is there any need to transition the birds from feeding from a flood condition, as is the case with feeders having special chick windows used to flood the feed pans with feed.

What has been described is a feeder for use in a poultry houses for feeding both young chick and older birds without having to change any of the settings of the feeder. Instead, the feeders need only be lifted by means of the conveyor winch and cable lifting arrange from their lowered positions (see FIG. 6) to their extended or suspended positions (FIG. 5) so as to accommodate the larger birds. By enabling young chicks as well as older birds to see the feed within the feed pans, the need to deposit feed on the floor or on paper for the younger birds may, in at least some cases, be either eliminated or greatly reduced. In addition, the position of the feed pan is separately adjustable, also by a lost motion connection, to account for variations in floor height and unevenness. The amount of feed delivered to the pan is controlled so sufficient feed is always available for the birds but excess feed, which can spoil, is not.

Referring to the lost motion connection 52 between grill collar 44 and upper drop tube 26, it will be understood that, as described in regard to FIGS. 9 and 10, this lost motion connection prevents undue strain from being imposed on feed drop tube 18 and permits the ready telescopic movement of the feed tube section without binding in the event the feed pan 23 rests on an uneven floor F. The degree of angular displacement permitted by lost motion connection 52 depends upon the amount of clearance between the inner diameter of collar and tube 26.

Still further, the lost motion connections of feeder 10, upon adjusting the height of the feeders above the level of floor F as the birds begin to grow insures that the feed pans are presented to the birds at a desired relation to the level of the floor at the position of the feeders. In other words, if the feeders of a feed line FL are initially resting in their lowered positions (as shown in FIG. 6) on a floor that is "stair stepped", the conveyor tube will be lowered until the feed pans 23 of the feeders for the lowest part of the floor rest on the floor. The lost motion connection 52 between the grill and the feed drop tube enables the feeders on the high floor areas to further collapse so that the feed pans of the feeders for the low areas can continue to move downwardly until the feed pans can move to their fully collapsed positions. Likewise, upon lifting such a feed line, the feeders on the high spots will remain on the floor as the lower feeders are raised to their desired heights. This insures that none of the feed pans will be raised too high above their local floor heights such that all of the birds will have ready access to the feed in the feed pans of the feeders, regardless of variations in local floor heights.

Figure 21:
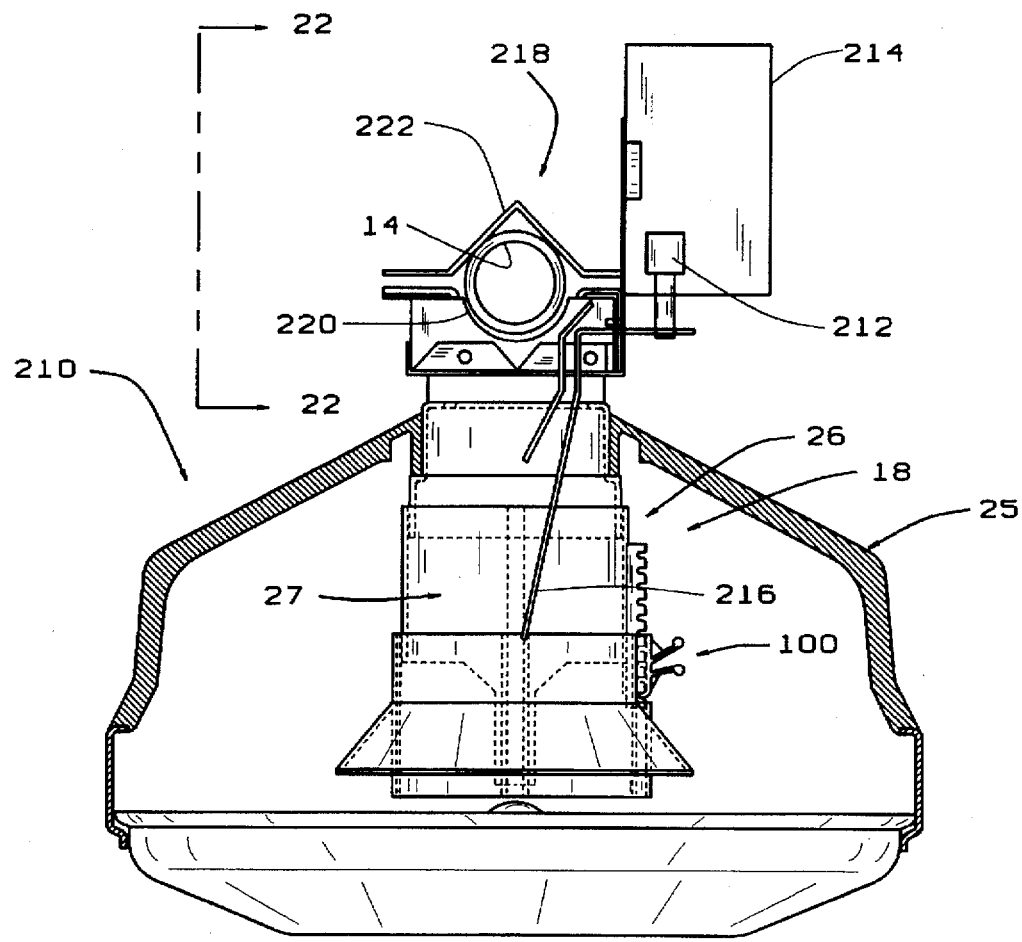
FIG. 21 is a side elevation view of a control feeder unit of the present invention having the same feed pan, drop tube and grill as is employed with the feeders illustrated in FIGS. 5 and 6.
Figure 22:
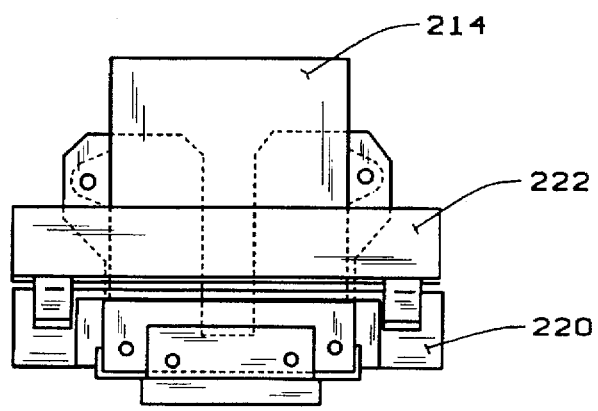
FIG. 22 is a view taken along line 22—22 of FIG. 21 illustrating the manner in which the control feeder shown in FIG. 21 may be removably installed on the feed conveyor tube.

Referring now to FIGS. 21 and 22, a feed control feeder of the present invention is indicated in its entirety at 210. This feed control feeder incorporates the same feed pan 23, grill 25 and feed drop tube 18 as the previously described feeder 10 so that the control unit 210 operates and appears similar to feeder 10. In this manner the control unit simulates the appearance and operation of the other feeders 10 in feed line FL. It will be understood that in FIGS. 21 and 22, reference characters less than 210 indicate parts having a similar construction and operation to similar numbered parts of feeder 10.

As best shown in FIG. 21, control feeder 210 has a feed conveyor switch 212 located in a switch box 214. This conveyor switch 212 has a feed sensor 216 located within feed drop tube 18 so as to be responsive to the amount of feed in the drop tube. Of course, the conveyor switch 212 may be connected to operate the electric motors EM for operation and termination of operation of the feed conveyor system FC in a manner well known to those skilled in the art.

More particularly, feed sensor 216 is movable within feed drop tube 18 from a first or tube full position (not shown) to a second or tube empty position (as shown in FIG. 21) for opening and closing switch 212 in response to the amount of feed within the feed drop tube. It will be appreciated that with the feed tube 18 filled with feed such that the feed within the drop tube serves as a feed reservoir for resupplying feed to feed pan 23 as the birds consume feed from feed pan 23, the level of feed within feed drop tube 18 will correspondingly drop. Upon the feed within the drop tube falling below a level which permits the switch arm 216 to move fully to its second or tube empty position (shown in FIG. 21), switch 212 is actuated to turn on the feed conveyor FC thereby to replenish the feed in the feeders 10 and in the control feeder 210. As feed is supplied to the control units, the feed will drop down through drop tube 18, fills feed pan 23, and backs up within the drop tube. As the feed fills the drop tube, the switch arm 216 is moved by the feed from its second to its first position. This in turn causes switch 212 to generate a signal which may be used to shut off the feed conveyor FC. In this manner, it is assured that feed is always supplied to the birds.

In FIG. 22, a removable attachment for the control unit to the feed conveyor tube 14 is illustrated in its entirety at 218. More specifically, attachment 218 comprises a lower cradle 220 adapted to engage the conveyor tube from below. An upper cradle 222 is hingedly attached to the lower cradle and overlies the upper portion of the conveyor tube. Bolts (not shown) are used to clamp the upper and lower cradles to the conveyor tube.

It will be appreciated that with prior art feeders that utilize windows which could be selectively opened to flood the feeder with feed so as to enable young chicks to see the feed, such prior art flood window feeders oftentimes trap relatively large quantities of feed (e.g., 1–2 pounds of feed) within the drop tube, and that such feeders discharge several pounds of feed into the feed pan, oftentimes much more feed that young chicks could possibly consume before the feed becomes fouled. If feed is entrapped within the drop tube for several days, the feed may tend to go stale and thus be unpalatable to the birds. As noted above, in these prior art flood window feeders, a relatively large quantity of feed (e.g., 1–2 pounds of feed) was discharged into the feed pan by the flood windows. The amount of feed exposed in the feed pan was generally substantially more than the young chicks could consume such that in many cases, this relatively large quantity of feed would become fouled by the young chicks walking of the feed and leaving their droppings in the feed. These two factors of stale and fouled feed often resulted in a stall in the growth rate of the birds at about the time the birds had grown sufficiently to make the transition from the chick pans filled with feed between the feeders or at about the time when the flood windows would be closed and fresh feed would be delivered to the feeder on a regular basis. This stall in the growth rate of the birds resulted in either a longer growout period for the birds, or the birds would be under their desired market weight when they were taken to market.

The feeders of the present invention prevent this stall in the growth rate by first preventing feed from becoming entrapped within the feeder such that the feed does not become stale. Secondly, the amount of feed discharged into the feeder is maintained to a quantity which even young chicks will consume before it becomes fouled. The amount of feed discharged in the feed pan while limited in amount, is constantly replenished with fresh feed such that a desired quantity of feed is available to the birds at all times. The particular features and functions of the feeder of the present invention which prevent such stall in the growth rate of the chickens will now be described.

Referring now to FIGS. 23A–23C, feeder 10 is shown in a vertical cross sectional view with feed, as indicated by the shaded areas on the inside of drop tube 18 and on the cone 36 of feed pan 23, stored within the drop tube 18. In this manner, the feed stored inside drop tube 18 functions as a reservoir for the continued discharge of feed into the feed pan as the birds consume feed from the feed pan thereby to maintain a substantially constant supply of feed in the feed pan as the birds consume the feed from the feed pan, even when the feed conveyor has not been run to deliver more feed to the feeder. More specifically, as feed is discharged from the space between the lower edge 96 of the lower drop tube section 27 and the upper face of the feed pan cone 36, the feed forms a relatively uniform depth layer on the cone. It will be appreciated that the feed will tend to pile up at the bottom of the cone in the bottom of the feed pan. In accordance with this invention, it will be noted that feed discharged from conveyor tube 14 into feeder 10 drops down from the conveyor tube within drop tube 18, initially, this feed will discharge onto the upper face of cone 36. The latter has an inclination which approximates the angle of repose of the feed. In that manner, feed discharged from the bottom of the drop tube will flow down along the outer face of the cone and will form a relatively thin, uniform layer of feed on the outer surface of the cone with the thickness of this layer being controlled by the distance the lower edge 96 of the outer drop tube section 27 is spaced above the surface on feed pan cone 36.

With drop tube 18 empty, upon operation of feed conveyor FC to deliver feed to the feeder, as feed initially is discharged into the drop tube, the feed drops down through the drop tube and flows out the bottom of the drop tube beneath the lower edge 96 of the control tube 92 so as to form the thin, uniform layer of feed on feed pan cone 36 with the angle of the feed on the cone assuming the angle of repose of the feed. As the layer of feed is formed on the cone, the feed will back up on the cone and will no longer flow out from under the lower edge 96 of the control tube 92 and will thus block the flow of additional of feed out of the drop tube and into the feed pan. With the flow of feed from the drop tube blocked, additional feed discharged from the feed conveyor will then fill up the interior of the drop tube 18 until it is completely filled (as shown in FIGS. 23A–23C). When the drop tube 18 becomes completely filled, no more feed can be discharged from the conveyor into the drop tube and thus causing feed conveyed in the feed conveyor to by-pass the filled feeder.

With feeder 10 in its fully lowered position, as illustrated in FIGS. 3 and 23C, it will be noted that drop tube 18 is in its most collapsed position such that the volume of the drop tube which receives feed from the feed conveyor tube 14 is minimized. In this manner, the amount of feed stored within drop tube 18 (i.e., the reservoir) is minimized and as feed within the drop tube flows from the bottom thereof into the feed pan, the level of the feed within the drop tube will also fall. Upon feed conveyor starting up to supply additional feed to the feeders, fresh feed will be deposited in the drop tubes on top of any feed remaining therein such that feed is dispensed into the feed pans on a "first-in-first-out" basis. In this manner, no feed is trapped within the feeder and thus the feed flows continuously as the birds eat the feed from the top to the bottom of the drop tube so as to insure that all of the feed is as fresh as possible when it is discharged from the drop tube onto the outer face on the feed pan cone 36 for consumption by the birds. In addition, the feed exposed to the birds is minimized so as to lessen the chances of the feed becoming fouled by the birds prior to its being eaten by the birds. It will be appreciated that with prior art feeders that utilized windows which could be selectively opened to flood the feeder with feed so as to enable young chicks to see the feed, such prior art flood window feeders oftentimes trapped relatively large quantities of feed (e.g., 1–2 pounds of feed) within the drop tube or such feeders discharged several pounds of feed into the feed pan. If feed is entrapped within the drop tube for several days, the feed may tend to go stale and thus be unpalatable to the birds. As noted above, in these prior art flood window feeders, a relatively large quantity of feed (e.g., 1–2 pounds of feed) was discharged into the feed pan by the flood windows. The amount of feed exposed in the feed pan was generally substantially more than the young chicks could consume such that in many cases, this relatively large quantity of feed would become fouled by the young chicks walking of the feed and leaving their droppings in the feed. These two factors of stale and fouled feed often resulted in a stall in the growth rate of the birds at about the time the birds had grown sufficiently to make the transition from the chick pans filled with feed between the feeders or at about the time when the flood windows would be closed and fresh feed would be delivered to the feeder on a regular basis. This stall in the growth rate of the birds resulted in either a longer growout period for the birds, or the birds would be under their desired market weight when they were taken to market.

The feeders of the present invention prevent this stall in the growth rate by first preventing feed from becoming entrapped within the feeder such that the feed does not become stale. Secondly, the amount of feed discharged into the feeder is maintained to a quantity which even young chicks will consume before it becomes fouled. The amount of feed discharged in the feed pan while limited in amount, is constantly replenished with fresh feed such that a desired quantity of feed is available to the birds at all times.

As the feeder is raised from its most collapsed position (as shown in FIGS. 3 and 23C) to an intermediate position (as shown in FIGS. 6 and 23B), the feed pan 23 remains in its shallow depth position, but the upper drop tube 26 is extended from the lower drop tube section 27. In this intermediate position, it will be appreciated that volume of the feed which is stored within the drop tube 18 is increased thus increasing the amount of feed that is available for discharge into feed pan 23. Of course, normally the feeder will not be moved from its lower most position to its intermediate or to its fully extended position until the birds have grown sufficiently to benefit from the feeder being raised. Further, as feeder 10 is moved to its fully extended position, as shown in FIGS. 5 and 23A, the volume of the feed reservoir or drop tube 18 will be even further increased. It will be appreciated that as the feeder is raised for the now larger birds, the feed within the drop tube is also increased which corresponds to the birds' demand for more feed in a given period. Again, this insure that a fully ration of feed is always present in the feed pan, even if the feed conveyor is run only periodically.

By only allowing a relatively thin layer of feed to be discharged onto the upper surface of feed pan cone 36, it will be appreciated that even though the amount of feed discharged from the drop tube into the feeder is minimized, to young chicks and to older birds, it appears as if the quantity of feed in the feeder is quite large and the feed is readily seen by even young chicks standing of the poultry house floor F. Yet, there is only a minimum quantity of feed present in the feed pan where it is most likely to become fouled or wasted by the birds.

Figure 24A:
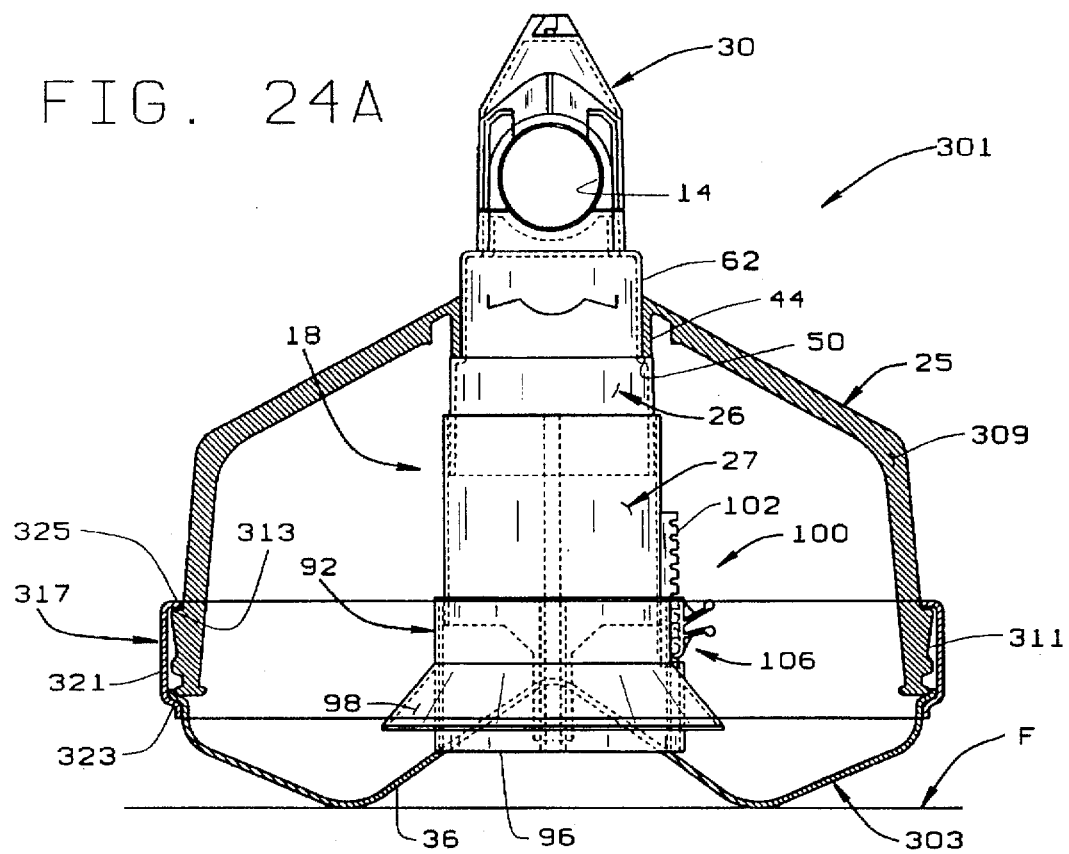
FIGS. 24A and 24B illustrate another embodiment of the feeder of the present invention in which a shallow depth feed pan is fixedly mounted relative to the grill and in which a ring (shown in FIG. 25) may be selectively installed on (or moved up and down on) the grill so as to effectively raise the height of the feed pan to a deep pan condition thereby to prevent adult birds from raking or billing feed out of the feed pan.
Figure 24B:
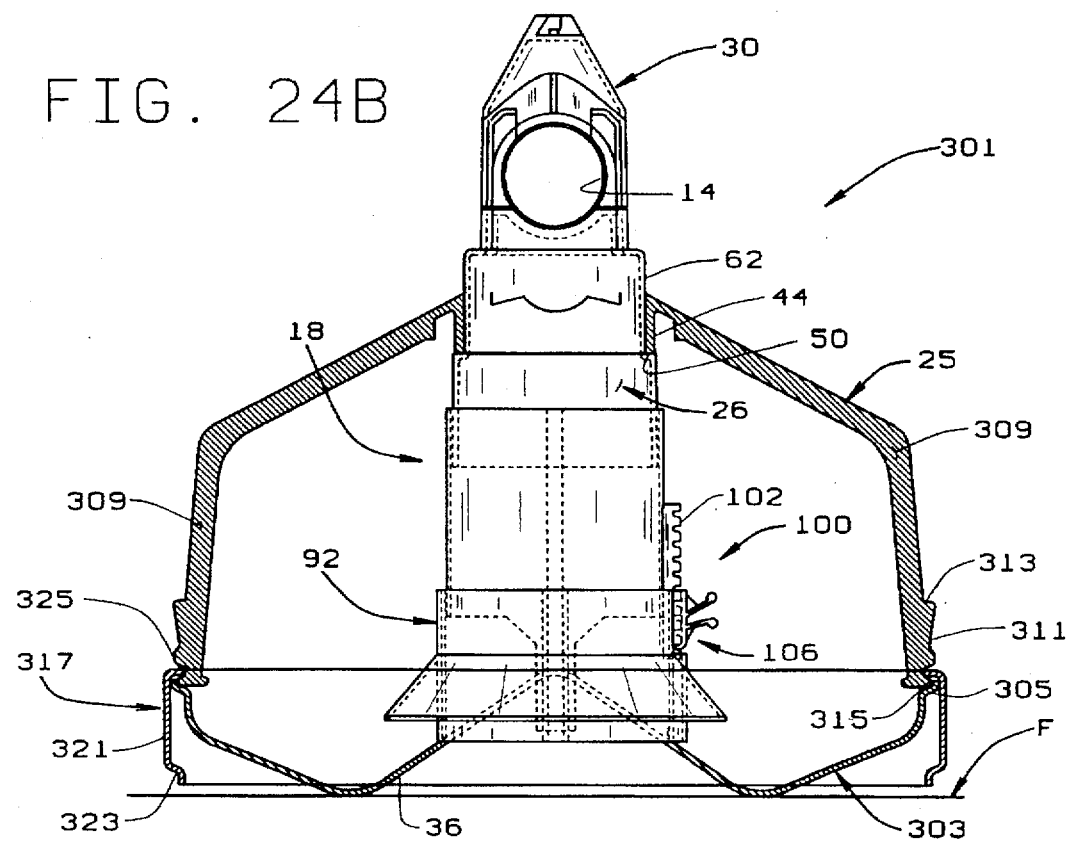

Referring now to FIGS. 24A and 24B, another embodiment of the feeder of the present invention is shown in its entirety by reference character 301. Feeder 301 is generally similar to feeder 10 heretofore described (and thus like reference characters indicate parts having a similar construction and operation), except for the feed pan and how it is changed from a shallow pan depth position (as shown in FIG. 24B) and a deep pan depth position (as shown in FIG. 24A). More particularly, feeder 301 has a fixed depth feed pan 303 having a cone projection 36 at its center and having a raised outer rim 305. An inwardly extending flange 307 is provided at the upper edge of the feed pan rim 305. Further, grill bars 309 of grill 25 do not have the integral rim 46 as has been heretofore described in regard to feeder 10. Instead, the lower ends of grill bars 307 are free of one another and at least some of the grill bars have an inclined outer face 311 and a detent ledge or shoulder 313 above the inclined surface. The lower end of each of the grill bars 309 has an outwardly projecting finger 315 extending therefrom. These fingers 315 are adapted to be engaged by the inwardly extending flange 307 formed on the upper portion of feed pan 303 thereby to secure the feed pan in fixed position relative to the grill in such manner that the feed pan does not move with respect to the grill.

Feeder 301 further has a removable split ring, as generally indicated at 317, which may be installed (or deployed) on or removed from the feeder so as to effectively change the height of the feed pan from a shallow pan depth condition (as shown in FIG. 24B) which enables young chicks to readily visually see into the feed pan while standing on the floor F of the poultry house and to see feed within the feed pan to a deep pan depth condition (as shown by the position of a young chick's eye level C1 in FIG. 6), which enables a larger bird ready access to feed within the feed pan while the bird stands on the floor of the poultry house and which prevents the larger birds from raking or billing feed out of the feed pan which results in a wastage of feed. As shown in FIG. 25, ring 317 has a optional split 319 which enables the ring to readily be flexed so as to facilitate the ready installation and removal of the ring on feeder 301 in the manner as will appear.

More particularly, ring 317 has a vertical rim 321 with a lower, inwardly projecting flange 323 at its lower end, and with an inwardly projecting upper flange 325. With the ring installed on the feeder in its shallow feed pan depth position (also referred to as its lowered position) as shown in FIG. 24B, it is seen that the lower margins of the ring are clear of the poultry house floor F and that the effective height of the feed pan is substantially the height of the feed pan 303 from its lowermost point adjacent the lower regions of the cone projection 36 to the uppermost reaches of upper flange 307. As noted above, this fixed height of feed pan 303 is such that even the smallest of young chicks can readily see into the feed pan. As the chicks grow in size, ting 317 may be manually raised on the feeder 301 from its shallow feed pan depth position (as shown in FIG. 24B) to its deep feed pan depth position (as shown in FIG. 24A) by sliding the ring upwardly on the feed pan 303 and on grill bars 309. As the ring is slid upwardly on the grill bars 309, the inwardly extending flange 325 on the ring engages the inclined surface 311 on the grill bars such that as the ring is moved upwardly, the inclined surfaces spread the ring outwardly, which outward movement is permitted by the elasticity of the spilt ring 319 (assuming that it is made of a suitable plastic or the like which may me readily stretched) until the upper, inwardly extending flange 325 on the ring snap locks in place on detent 313 on the grill ribs thus holding the ring in its raised position, as shown in FIG. 24A. Of course, ring 317 may be readily returned to tis shallow pan position or removed entirely from feeder 301 by opening the ring on the split 319 and removing the ring from the feeder. It will also be recognized that more than one detent flange may be provided on the grill fibs such that the ring can be installed in a number of different intermediate height positions between its fully lowered and fully raised positions. There may be some breeds of chickens or turkeys where it would be desirable to use such intermediate ting positions during the growout cycle.

While grill bars 309, as described above, were specified to have inclined surfaces and detent flanges 313 formed thereon, it will be understood that the detents could be formed on the ring and that these detents would be cooperable with notches formed in the grill bars for holding the ring 317 in its deep pan position. Further, means different from the above described detents and ring flange 325 may be used for adjusting feed pan 303 to its desired shallow or deep depth feed pan condition (or in any intermediate position between the shallow and deep feed pan positions, as above described). For example, rather that providing a ting which may be selectively raised and lower, a ring may be provided which may merely be snapped (clipped) on the grill bars of a feeder with a fixed low feed so as to ensure that the more adult birds have access to the feed in the feeder when they are young, and to prevent the raking and billing of the feed by more adult birds. In addition, add-on shields may be secured to the feeder by means of clips or other fasteners which would enable an attendant in the poultry house to selective move the feeders between their desired shallow and deep pan positions.

Referring to FIG. 26, another embodiment of the feeder of this invention, as indicated in its entirety at 401, is similar to feeder 301 in that it has a fixed, shallow depth feeder pan 403. However, in place of the ring 317 that may be selectively raised and lowered on feeder 301, feeder 401 has a ring 405 which is hingedly attached to and integrally molded to feed pan 403 by means of molded in hinges 407 linking the ring to the upper portion of feed pan 403 proximate the juncture of the upper portion of the feed pan which engages the lower portions of the grill bars 409 and which hold the feed pan 405 securely on the grill bars. Because the ring 405 is preferably molded with feed pan 403 and is made of a similar synthetic resin (plastic) material as the feed pan, it will be appreciated that the ring is deformable an amount sufficient to allow the ring to be hingedly moved between its shallow depth pan condition (as shown on the right-hand portion of the feed pan, as illustrated in FIG. 26) and a raised or deep pan position (as shown on the left-hand portion of FIG. 26) in which the ring is raised so as to still provide access for larger birds to access the feed within feed pan 403 while preventing the now larger birds from raking or billing feed out of the feed pan. More specifically, it will be understood that with the ring 405 in its shallow depth pan position (as shown in the right-hand portion of FIG. 26), the ring may be raised to its deep pan position by manually grasping the ring at one side thereof and by bending the ring upwardly about the hinge 407 and by manually working around the ring to bend the ring up about its hinge. Likewise, the ring may be selectively moved from its raised position to its lowered position by bending the ring down on its hinge 407. It will be appreciated, that since the ring is preferably molded on a suitable synthetic plastic material (e.g., polypropylene), the ring will have sufficient stretch so as to permit it to deform and to move between its raised and lowered positions. It will also be understood that as the ring is moved between its raised or lowered positions, it will "snap over center" after a sufficient portion of the ring has been so manually moved to its new desired position.

Figure 27:
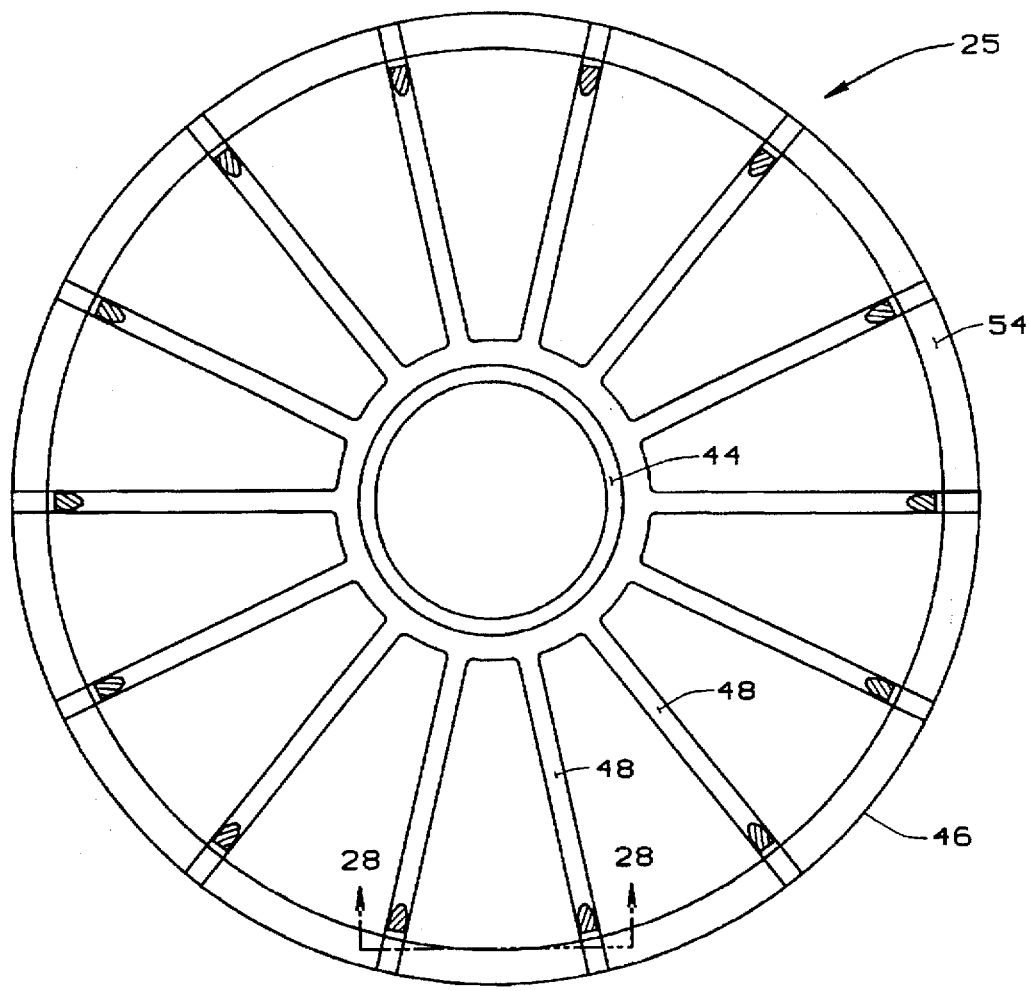
FIG. 27 is a plan view of the grill for a feeder of the present invention showing the cross section of the grill bars which provides the same spacing or distance between the grill bars to a young bird upon exiting the feeder as when the bird entered the feeder thereby to prevent birds from becoming entrapped within the feeder.

Further in accordance with this invention, the grill bars 48 of feeder 10 and the grill bars 309 of feeders 10, 301 and 401 are so spaced from one another and are so shaped as to readily permit young chicks to enter and exit the feed pan for feeding such that the spacing of the grill bars is the same to the birds leaving the feeder as it is to their entering the feeder. This helps to insure that young birds which may be able to squeeze between the grill bars to enter the feeder are also able to egress from the feeder such that they do not become trapped with the feeder where they would likely die. More specifically, as shown in FIG. 27, grill 25 has fourteen grill bars 48 which are spaced at equal angular intervals around the grill. Of course, the space between adjacent grill bars 48 depends on the diameter of the grill. However, in accordance with this invention, the spacing between adjacent grill bars 48 is such as to readily allow one (and preferably only one) full grown bird to readily insert its neck and head between adjacent grill bars to feed on the feed deposited within feed pan 23. This allows fourteen birds to eat simultaneously from feeder 10 while assuring adequate spacing for each of the birds while feeding.

Figure 28:
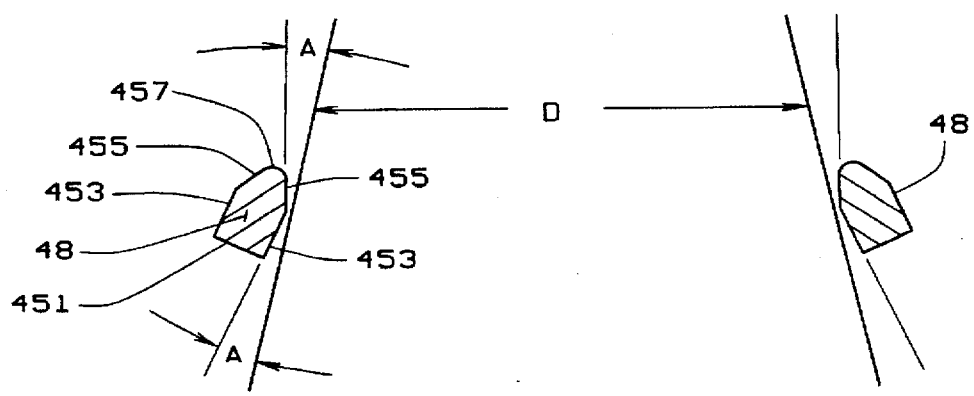
FIG. 28 is an enlarged cross section view take along line 28—28 of FIG. 27 illustrating the cross section of the grill bars which allows the birds the same distance and angle between the grill bars for access to and for egress from the feeder.

In accordance with this invention, each of the grill bars 48 is so shaped (as shown in FIGS. 27 and 29) as to insure that there is equal distance D (see FIG. 28) of about 2.47 inches between the grill bars exiting the feeder as there is to enter the feeder. This spacing of the grill bars 48 was chosen to allow young chicks to readily enter and egress from the feeder such that the young chicks could eat feed directly from the feed pan. However, as the chicks grow in size, the spacing of the grill bars excludes these now larger birds from entering the feed pan. However, the spacing of the grill bars is sufficiently wide that these larger birds can stand on the floor outside the feed pan and readily insert their head and neck through the grill bars to feed on feed in the feed pan. In addition, each of the grill bars is so shaped in cross section that the grill bar has a flat outer face 451, parallel side faces 453, tapered inner faces 455, and an inner apex 457, as shown in FIG. 29. It will be noted that the angle A between a plane tangent to the apex between side face 453 and the tapered inner face 455 is the same as the angle A between the plane tangent to the above-said apex and side face 453 such that if the bird can squeeze past the grill bars to enter the feeder, the same bird can likely squeeze past the same grill bars without the bird becoming trapped within the feeder. This insures that birds which squeeze into the feeder do not become entrapped in the feeder where they could possibly die. This uniform spacing is insured by the tapered inner edge of the grill bars 48. It will be noted in FIG. 27 that each of the grill bars has a tapered inner edge with the tapered side flanges having an included angle therebetween substantially the same as the angle about which the grill bars are equally angularly spaced about the centerline of the feeder (i.e., about 25.71° if fourteen grill bars are used). Further, the grill bars are shaped so as to have a radiused inner face with no sharp corners or edges. This allows a bird to insert its neck between the grill bars without substantial danger that the bird's neck feathers would prevent the bird from withdrawing its head from between the grill bars.

While the feeder 10 of the present invention has been particularly described for use with poultry, such as chickens or turkeys, those skilled in the art will recognize that certain features of this invention may well have application in automated feeding systems for other livestock, such as swine.

In view of the foregoing, it will be seen that the several objects of the invention are achieved and other advantageous results are obtained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A removable connector for attaching a feeder or other appliance to a feed conveyor tube, said a longitudinal conveyor tube having an axis, said feeder having a pair of spaced legs on the upper end thereof, said legs having an inner part circular surface cooperable with the outer surface of said feed conveyor tube, the upper ends of said legs being spaced apart a distance less than the diameter of said feed conveyor tube such that upon engagement of said feed conveyor tube and the upper ends of said legs and upon application of force to bring said conveyor tube and said legs together, said legs will deflect apart to permit said conveyor tube to pass between said legs and to be received within said part circular surfaces of said legs, and a cap installed in a generally perpendicular direction relative to said conveyor tube longitudinal axis on the outside of said legs so as to resist outward movement of said legs thereby to at least partly aid in retaining said conveyor tube between said legs.

2. A connector as set forth in claim 1 wherein said cap has a pair of spaced arms spaced apart a distance less than the diameter of said conveyor tube, said cap arms being so structured to snap in place over said conveyor tube.

3. A connector as set forth in claim 2 wherein said upper portion of said feed tube is a unitary molding of a suitable synthetic resin, and wherein said legs are resiliently bendable for the snap fit reception of said conveyor tube between said legs.

4. A connector as set forth in claim 1 wherein said cap has arms thereon with the bottom portions of said arms being spaced apart a distance less than the diameter of said conveyor tube such that said cap snap locks in place on said conveyor tube and on said feeder.

5. A method of raising poultry from young chicks to mature birds ready for market, said birds being raised in a poultry house being provided with a plurality of feeders for presenting feed to the birds within said house, each of said feeders having a feed pan in which said feed is deposited, a feed conveyor for delivering feed to said feeders, and means for selectively raising and lowering said feeders with respect to the floor of said house, said method comprising the steps of:

introducing young chicks into said house;

presenting feed in the feed pans of said feeders in such manner that said young chicks standing on the floor of said house can visibly see said feed within said feeders;

permitting access of said young chicks to said feed in said feed pans; and upon said birds growing in height, raising said feeders with respect to said floor thereby to change the depth of said feed pans from a shallow depth position to a deeper depth position thereby to prevent said larger birds from raking feed from said feed pans.

6. A method of raising young birds, such as chickens or turkeys, from young chicks to birds ready for market in a poultry house substantially without a stall in the growth rate of such birds as the feeding of the birds is converted from a feeder adapted for the ready viewing of feed by said young chicks in a feed pan to a feeder adapted for the consumption of feed by larger birds such that the larger birds are effectively prevented from raking feed from said feeder, said poultry house having a floor, a plurality of feeders, each of said feeders having a feed pan, and a feed conveyor for delivering feed to said feeders, said poultry house further having means for raising and lowering said feeders relative to said floor, each of the feed pans of said feeders being movable between a shallow pan and a deeper pan depth position, each said feeder having a drop tube between said feed conveyor and said feed pan for the delivery of feed from said feed conveyor to said feed pan, wherein said method comprises the steps of:

lowering said feed conveyor within said poultry house prior to the introduction of young chicks within said poultry house such that said feed pans of said feeders are in their said shallow depth positions thus enabling said young chicks standing on the floor of said house to visually see feed deposited by said drop tube within said feed pan;

contemporaneously with changing said feed pans to their said shallow depth positions, minimizing the volume of feed stored within said drop tube of such feeders;

delivering feed to said feeders via said feed conveyor so as to deliver a desired quantity of feed to said feed pans of said feeders and to deposit a quantity of feed within the drop tubes of said feeders whereby said feed within said drop tubes constitutes a reservoir of feed;

discharging feed from the bottom of said drop tube into said feed pan so as to deposit a predetermined quantity of feed within said feed pan for consumption by said young chicks, such predetermined quantity of feed within said feed pan being sufficient to make such feed visible to said young chicks and being of such quantity that said feed within said feed pan does not become overly stale or fouled prior to its being consumed by said chicks;

providing access to said feed within said feed pan by said chicks;

upon said chicks consuming feed from within said feed pan, replenishing the feed consumed from said feed pan with fresh feed from said reservoir of feed within said drop tube so as to substantially maintain said desired quantity of feed within said feed pan with said feed flowing from said feed conveyor, into said drop tube and then into said feed pan on a first in, first out basis thereby to minimize the tendency of feed within said drop tube from becoming stale;

if necessary, delivering additional feed to said drop tubes from said feed conveyor;

upon the birds growing in height, raising said feed conveyor so as to change said feed pans from said shallow depth to a deeper depth position so as to prevent said now larger birds from raking feed out of said feed pans;

contemporaneously with changing said feed pans from said shallow depth to said deeper depth pan positions, increasing the volume of said drop tube so as to have a larger reservoir of stored feed within said feeder for supplying said now larger birds with additional feed;

upon changing said feed pans to said deeper depth positions, said birds only having to consume a portion of said desired quantity of feed in said feed pan to effect the flow of fresh feed from within said drop tube to replenish the feed consumed; and as required, delivering more feed to said drop tube from said conveyor so as to maintain a reservoir of feed within said drop tube such that as said birds consume said feed from said feed pan, feed will flow out of the bottom of said drop tube to replenish the feed consumed from the feed pan between the times additional feed is delivered to said drop tubes by said feed conveyor.

7. The method of raising poultry from young chicks to birds ready for market with a better rate of converting feed fed to the birds compared to the live weight of the birds at the time the birds are ready for market, said birds being raised in a poultry house having a floor, a plurality of said feeders within said house, each of said feeders having a feed pan, each of the feed pans being changeable from a shallow depth to a deeper depth position, and a feed conveyor for delivering feed to each of said feeders, each of said feeders having a drop tube extending generally between said feed conveyor and said feed pan, said feed being discharged out of the bottom of said drop tube into said feed pan, said method comprising the steps of:

introducing young chicks into said house;

positioning said feed pans in their said shallow depth positions;

presenting a predetermined quantity of feed in said feed pans of said feeders in such manner that said young chicks standing on the floor of said house can visibly see said feed within said feeders;

permitting access of said young chicks to said feed in said feed pans;

continuously supplying fresh feed from within said drop tube in a first in, first out basis to replenish the feed within said feed pans consumed by said chicks so as to substantially maintain said predetermined quantity of feed within said feed pan;

upon said birds growing in height, raising said feeders with respect to said floor thereby to change the depth of each of said feed pans from a shallow depth position to a deeper depth position thereby to prevent said larger birds from raking feed from said feed pans; and continuously supplying fresh feed from within said drop tube to said feed pan with the latter in its deeper depth position so as to replenish the feed within said feed pans consumed by said birds such that substantially all of the feed conveyed by said feed conveyor to said feeders is consumed by said birds.

* * * * *